United States Patent
Gao et al.

(10) Patent No.: US 11,272,220 B2
(45) Date of Patent: Mar. 8, 2022

(54) BOUNDARY FORCED PARTITION

(71) Applicant: Huawei Technologies Co., Ltd., Shenzhen (CN)

(72) Inventors: Han Gao, Munich (DE); Zhijie Zhao, Munich (DE); Semih Esenlik, Munich (DE); Anand Meher Kotra, Munich (DE); Shan Liu, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/734,018

(22) Filed: Jan. 3, 2020

(65) Prior Publication Data

US 2020/0145698 A1    May 7, 2020

Related U.S. Application Data

(63) Continuation of application No. PCT/EP2017/066700, filed on Jul. 4, 2017.

(51) Int. Cl.
*H04N 19/96* (2014.01)
*H04N 19/119* (2014.01)
(Continued)

(52) U.S. Cl.
CPC .......... *H04N 19/96* (2014.11); *H04N 19/119* (2014.11); *H04N 19/176* (2014.11); *H04N 19/184* (2014.11); *H04N 19/50* (2014.11)

(58) Field of Classification Search
CPC ....... H04N 19/50; H04N 19/96; H04N 19/119
See application file for complete search history.

(56) References Cited

U.S. PATENT DOCUMENTS 8,582,901 B2 * 11/2013 Cheon .................... H04N 19/14
382/232
8,837,840 B2 * 9/2014 Cheon .................... G06T 9/004
382/232
(Continued)

FOREIGN PATENT DOCUMENTS

EP        3059708 A1    8/2016
EP        3383043 A1    10/2018
(Continued)

OTHER PUBLICATIONS

Yang et al., "CTB splitting on frame boundary for arbitrary resolution video," Joint Collaborative Team on Video Coding (JCT-VC) of ITU-T SG16 WP3 and ISO/IEC JTC1/SC29/WG11, Guangshou, CN, JCTVC-C025, m1803601, pp. 1-4, International Telecommunication Union, Geneva, Switzerland (Oct. 7-15, 2010).
(Continued)

*Primary Examiner* — Boubacar Abdou Tchoussou
(74) *Attorney, Agent, or Firm* — Leydig, Voit & Mayer, Ltd.

(57) ABSTRACT

Embodiments provide an apparatus and method of partitioning of an image or an image slice. In particular, on an image processing apparatus, the image or image slice is split into an integer number of coding tree units in both vertical and horizontal directions. Boundary coding tree units are then at least partially forced-split so that at least one resulting coding unit is a result of binary-tree partitioning, i.e., includes a coding unit which is longer on one side than on the other side. The longer side is parallel or concurrent to the image or image slice boundary. Recursively partitioning coding units that span the picture boundary without the requirement for signaling partition information in a bitstream can be achieved.

10 Claims, 7 Drawing Sheets

(a) Forced BT with forced QT level 0

(b) Forced BT with forced QT level 1

(51) Int. Cl.
*H04N 19/176* (2014.01)
*H04N 19/184* (2014.01)
*H04N 19/50* (2014.01)

(56) References Cited

U.S. PATENT DOCUMENTS

| | | | | |
|---|---|---|---|---|
| 8,842,922 | B2* | 9/2014 | Cheon | G06T 9/00 |
| | | | | 382/232 |
| 8,842,925 | B2* | 9/2014 | Cheon | G06T 9/004 |
| | | | | 382/233 |
| 8,842,926 | B2* | 9/2014 | Cheon | H04N 19/174 |
| | | | | 382/233 |
| 9,264,708 | B2* | 2/2016 | Cheon | H04N 19/17 |
| 10,979,714 | B2* | 4/2021 | Jang | H04N 19/80 |
| 2013/0083861 | A1* | 4/2013 | Cheon | H04N 19/119 |
| | | | | 375/240.25 |
| 2015/0350566 | A1* | 12/2015 | Hu | H04N 19/122 |
| | | | | 348/581 |
| 2016/0373766 | A1* | 12/2016 | Fuldseth | H04N 19/103 |
| 2017/0347095 | A1* | 11/2017 | Panusopone | H04N 19/70 |
| 2019/0075328 | A1* | 3/2019 | Huang | H04N 19/167 |
| 2019/0208209 | A1* | 7/2019 | Jang | H04N 19/117 |
| 2020/0077094 | A1* | 3/2020 | Poirier | H04N 19/176 |

FOREIGN PATENT DOCUMENTS

| | | |
|---|---|---|
| JP | 2013509788 A | 3/2013 |
| JP | 2015516769 A | 6/2015 |
| JP | 2019535204 A | 12/2019 |
| KR | 20110047697 A | 5/2011 |
| KR | 101452713 B1 | 10/2014 |
| WO | 2016090568 A1 | 6/2016 |
| WO | 2016091161 A1 | 6/2016 |
| WO | 2018070550 A1 | 4/2018 |

OTHER PUBLICATIONS

"Algorithm description of Joint Exploration Test Model 5 (JEM5)", ISO/IEC JTC1/SC29/WG11/N16698, Joint Video Exploration Team (JVET) of ITU-T SG16 WP3 and ISO/IEC JTC1/SC29/WG11, Geneva, Switzerland, JVET-E1001V2, pp. 1-44, International Telecommunication Union, Geneva, Switzerland (Jan. 12-20, 2017).

Sze et al., "High Efficiency Video Coding (HEVC) Algorithms and Architectures," Integrated Circuits and Systems, pp. 1-384, Springer Publishing, New York, New York (2014).

Chen et al., "Algorithm Description of Joint Exploration Test Model 2," Joint Video Exploration Team (JVET) of ITU-T SG 16 WP 3 and ISO/IEC JTC 1/SC 29/WG 11, 2nd Meeting: San Diego, USA, JVET-B1001_v3, total 32 pages (Feb. 20-26, 2016).

* cited by examiner

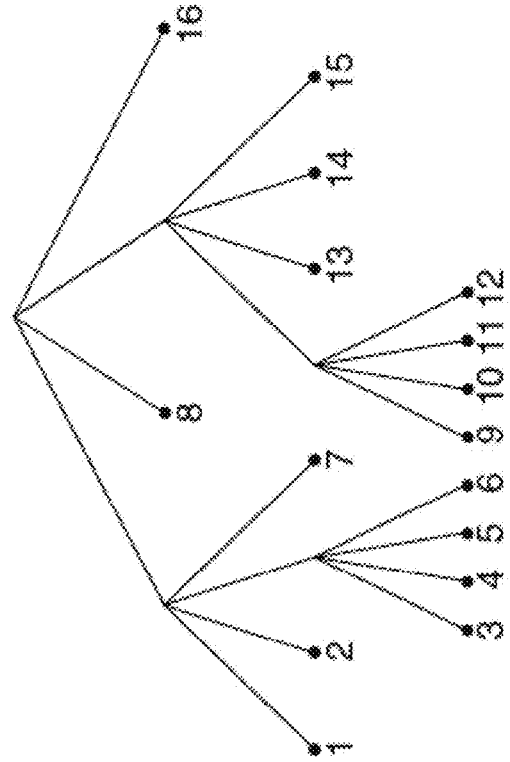
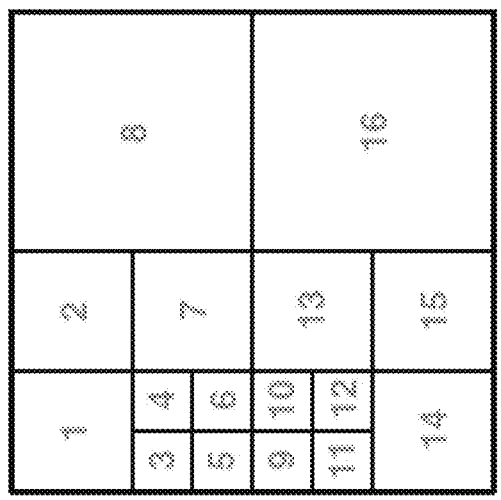
Fig. 3
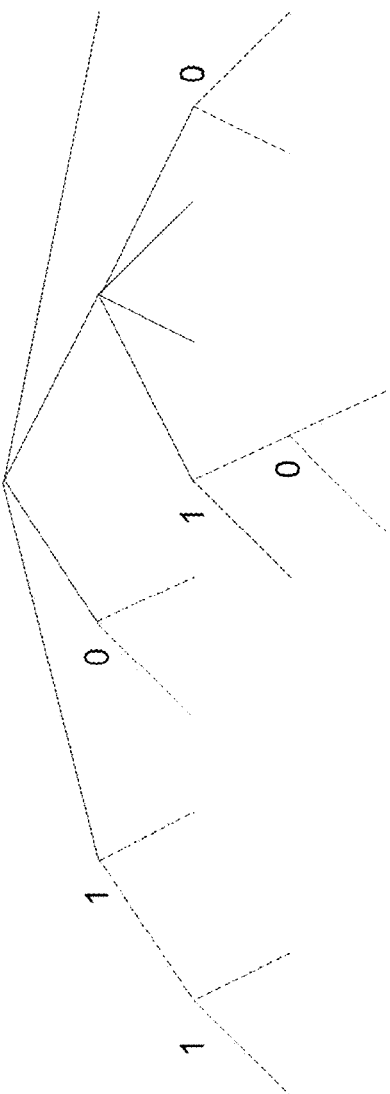
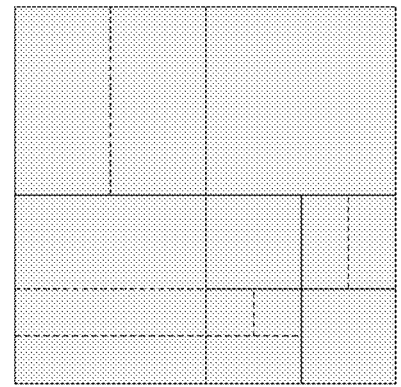
Fig. 4

BOUNDARY FORCED PARTITION

CROSS-REFERENCE TO RELATED APPLICATIONS

This application is a continuation of International Application No. PCT/EP2017/066700, filed on Jul. 4, 2017, the disclosure of which is hereby incorporated by reference in its entirety.

TECHNICAL FIELD

The present disclosure relates to image and/or video coding and decoding and in particular to splitting of the image into coding units.

BACKGROUND

Current block-based hybrid video codecs employ predictive coding. A picture of a video sequence is subdivided into blocks of pixels and these blocks are then coded. Instead of coding a block pixel by pixel, the entire block is predicted using already encoded pixels in the spatial or temporal proximity of the block. The encoder further processes only the differences between the block and its prediction. The further processing typically includes a transformation of the block pixels into coefficients in a transformation domain. The coefficients may then be further compressed (e.g., by means of quantization) and further compacted (e.g., by entropy coding) to form a bitstream. The bitstream can further include any signaling information which enables the decoder to decode the encoded video. For instance, the signaling may include settings concerning the encoder settings such as size of the input picture, frame rate, quantization step indication, prediction applied to the blocks of the pictures, or the like.

The differences between a block and its prediction are known as the residual of the block. More specifically, each pixel of the block has a residual, which is the difference between an intensity level of that pixel and its predicted intensity level. The intensity level of a pixel is referred to as the pixel value or value of the pixel. The residuals of all the pixels of a block are referred to collectively as the residual of the block. In other words, the block has a residual which is a set or matrix consisting of the residuals of all the pixels of the block. The residuals are then transformed, quantized, and coded together with signaling information. The coding may include various form of fixed and variable length coding including arithmetic coding or other entropy coding types.

In the block-based hybrid video coding, each picture is partitioned into blocks of samples and multiple blocks within a picture are aggregated to form slices as independently decodable entities. The blocks, to which prediction and/or transformation are applied is referred to as a coding unit (CU) or coding block (CB). The coding units may have different sizes.

For instance, in High-Efficiency Video Coding (HEVC, also known as H.265), a video frame is subdivided into coding tree units (CTUs, also referred to as coding tree blocks, CTBs). CTBs are disjoint square blocks of the same size, for instance 64×64 samples. Each CTB serves as the root of a block partitioning quad-tree structure, the coding tree. The CTBs can be further subdivided along the coding tree structure into coding blocks. For the coding blocks, prediction type is determined. The coding blocks may be further split into smaller transformation blocks to which transformation and quantization is applied.

Details concerning the partitioning in HEVC can be found in V. Sze et al (Ed.), High Efficiency Video Coding (HEVC): Algorithms and Architectures, Springer, 2014, Chapter 3.2.

In addition, WO 2016/090568 shows a binary tree structure for partitioning a unit into multiple smaller units using the quad-tree plus a binary tree structure. Accordingly, the root unit is firstly partitioned by a quad-tree structure, and then the leaf node of the quad-tree is further partitioned by a binary tree structure.

SUMMARY

In the HEVC standard, the CTUs and CUs located on the slice or picture boundaries will be forced-split using quad-tree partitioning until the right bottom sample of the leaf node is located within the slice or picture boundary. The forced quad-tree partitioning does not need to be signaled in the bitstream, as long as the splitting rules are fixed (predefined). The purpose of forced partitioning is to enable encoder and decoder to process pictures and slices which have horizontal and/or vertical size that is not an integer multiple of the respective horizontal and/or vertical size of the CTU.

In HEVC as well as in WO 2016/090568, the forced partitioning process splits CTUs and CUs located on the frame boundary hierarchically by quad-tree approach without rate-distortion (RC) optimization until the whole current CU lies inside the slice or picture boundary. These forced partitions are no need to be signaled in the bitstream. However, splitting to very small coding units may introduce further complexity and signaling requirements in connection with separate further processing (coding, decoding) of the small coding units.

According to the present disclosure, the forced partitioning applies binary tree splitting at least in the deepest partitioning hierarchy level or at least in a partitioning level other than the deepest partitioning hierarchy level in which a coding unit remains not entirely within the boundary portion.

Such splitting provides higher efficiency since it results to a smaller number of coding units in the deepest hierarchy level.

According to an aspect of the invention, an apparatus is provided for splitting an image portion into coding units including a processing circuitry which, in operation subdivides the image portion into an integer number of coding tree units with a predetermined size and a boundary portion with a size smaller than the predetermined size in at least a first direction which is either horizontal or vertical direction; and partitions the boundary portion hierarchically into coding units including a deepest coding unit with different sizes in respective horizontal and vertical directions, the deepest coding unit being smaller in the first direction.

An advantage of this approach is avoiding too many small CUs on the picture boundary which may also result in a more efficient coding of the boundary portion.

According to an example, the processing circuitry is configured to partition the boundary portion by binary tree splitting at least in the deepest partitioning level.

In addition, or alternatively to the binary tree partitioning, the processing circuitry can be configured to partition the boundary portion also by quad-tree splitting.

According to one example, the processing circuitry, in operation, partitions the boundary portion by quad-tree splitting in N shallowest levels, N being an integer larger than or equal to zero and smaller than the number of partitioning hierarchy levels; and partitions the boundary portion by binary tree splitting in the remaining partitioning hierarchy levels.

This approach provides a greater flexibility in configuration and still ensures that the boundary is coded efficiently by avoiding a great number of small square boundary CUs.

In one implementation, the processing circuitry, in operation, partitions the boundary portion until the deepest-level coding unit remains entirely within the boundary portion.

In one implementation, processing circuitry, in operation, partitions the boundary portion by binary tree splitting in horizontal and in vertical direction.

In addition or alternatively, the processing circuitry, in operation, partitions a in each hierarchy level a corner portion of the boundary portion by quad-tree splitting.

Alternatively to mixing quad-tree and binary-tree splitting for the boundary portion CTU, the processing circuitry can be configured to partition boundary portion in all partitioning levels by binary tree splitting.

According to an aspect of the invention, an apparatus is provided for encoding an image of a video sequence, the apparatus comprising the apparatus for splitting an image portion into coding units according to any of the above described examples and implementations; an image coding unit configured to encode the coding units; and a bitstream forming unit configured to generate a bitstream including the coded coding units and a partitioning information indicating how the coding tree units are partitioned.

For example, the encoder further comprises a rate-distortion optimization unit configured to determine hierarchical partitioning the boundary portion according to rate-distortion optimization for any of partitioning levels apart from the deepest level.

Another aspect of the present invention includes an apparatus for decoding an image of a video sequence comprising: the apparatus for determining splitting of an image portion to be decoded into coding units according to any of the above described examples and implementations; a bitstream parser for parsing a bitstream including the coded coding units and a partitioning information indicating how the coding tree units are partitioned and based on the determined splitting of the image portion; and an image decoding unit for decoding the coded coding units.

According to an exemplary implementation, the splitting of the boundary portion into coding units is a predefined splitting and the partitioning information does not relate to the splitting of the boundary portion.

The processing circuitry of the apparatus for decoding and/or apparatus for encoding may be configured to partition boundary portion by quad-tree splitting in N shallowest levels, N being an integer larger than or equal to zero and smaller than the number of partitioning hierarchy levels; and partition boundary portion by binary tree splitting in the remaining partitioning hierarchy levels. Moreover, in an exemplary implementation, the partitioning information includes N or N is derived based on type of prediction applied to encode the image being processed. N can be derived based on the size of a boundary portion with a size smaller than the predetermined size in either horizontal or vertical direction.

According to an aspect of the present invention, a method is provided for splitting an image portion into coding units including the steps of subdividing the image portion into an integer number of coding tree units with a predetermined size and a boundary portion with a size smaller than the predetermined size in at least a first direction which is either horizontal or vertical direction, and partitioning the boundary portion hierarchically into coding units including a deepest coding unit with different sizes in respective horizontal and vertical directions, the deepest coding unit being smaller in the first direction.

In one exemplary embodiment, the partitioning of the boundary portion further comprises the steps of: starting with a current partitioning level being the shallowest partitioning level; sequentially splitting the boundary portion to coding units of the current partitioning level, until boundary coding units of the current partitioning level fall entirely within the boundary portion; and as soon as the coding unit of the current partitioning level does not fall within the boundary portion, increase the partitioning level and further partition said coding unit, wherein a quad-tree partitioning is used for N shallowest partitioning levels and binary tree partitioning is used otherwise, N being an integer larger than or equal to zero and smaller than the number of partitioning hierarchy levels.

According to another aspect of the present invention, a method is provided for encoding an image of a video sequence comprising the steps of splitting an image portion into coding units according to any of the methods as specified above; encoding the coding units; and generating a bitstream including the coded coding units and a partitioning information indicating how the coding tree units are partitioned.

According to another aspect of the present invention, a method for decoding an image of a video sequence comprising: determining splitting of an image portion to be decoded into coding units according to any of the methods as specified above; parsing a bitstream including the coded coding units and a partitioning information indicating how the coding tree units are partitioned and based on the determined splitting of the image portion; and decoding the coded coding units.

According to an example, the partitioning step partitions the boundary portion by binary tree splitting at least in the deepest partitioning level.

In addition, or alternatively to the binary tree partitioning, the partitioning step may partition the boundary portion also by quad-tree splitting.

According to one example, the partitioning step partitions the boundary portion by quad-tree splitting in N shallowest levels, N being an integer larger than or equal to zero and smaller than the number of partitioning hierarchy levels; and partitions the boundary portion by binary tree splitting in the remaining partitioning hierarchy levels.

In one implementation, the partitioning step partitions the boundary portion until the deepest-level coding unit remains entirely within the boundary portion.

In one implementation, processing circuitry, in operation, partitions the boundary portion by binary tree splitting in horizontal and in vertical direction.

In addition or alternatively, the processing step partitions a in each hierarchy level a corner portion of the boundary portion by quad-tree splitting.

Alternatively to mixing quad-tree and binary-tree splitting for the boundary portion CTU, the partitioning step may partition boundary portion in all partitioning levels by binary tree splitting.

According another aspect of the present invention, a computer readable medium is provided, storing instructions which, when executed by a processor, cause the processor to execute method according to any of aspects and examples above.

BRIEF DESCRIPTION OF DRAWINGS

In the following exemplary embodiments are described in more detail with reference to the attached figures and drawings, in which:

FIG. 3 is a schematic drawing illustrating an example of quad-tree partitioning employed by HEVC.

FIG. 4 is a schematic drawing illustrating an example of quad-tree/binary-tree partitioning.

DETAILED DESCRIPTION OF EMBODIMENTS

The present disclosure relates to splitting of an image into smaller units for further processing. Such splitting may be advantageously used in still image or video image coding and decoding. In the following, exemplary video coder and decoder are described, which can implement the splitting according to the present disclosure.

Figure 1:
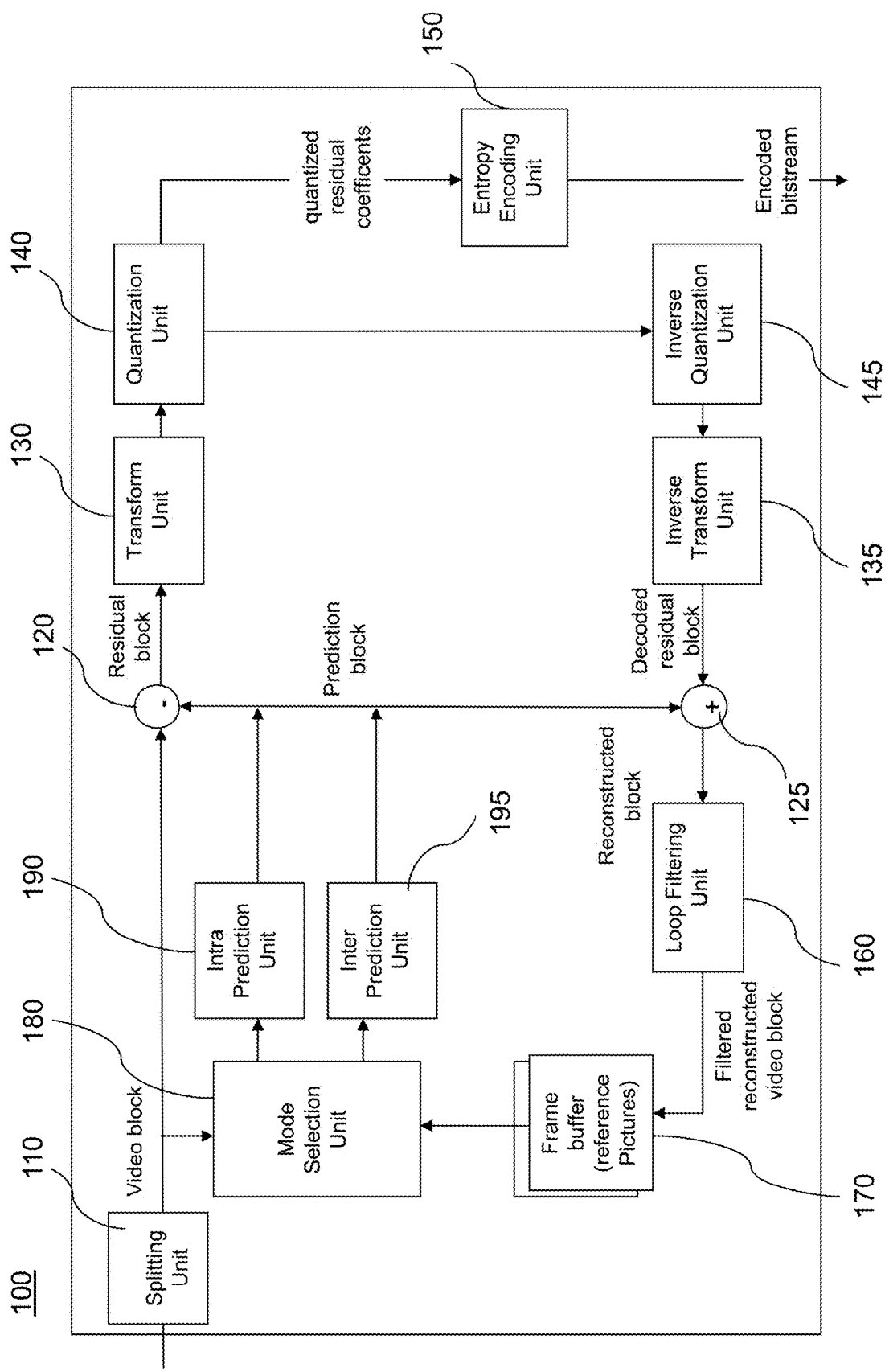
FIG. 1 is a block diagram showing an exemplary structure of a video encoder.

FIG. 1 shows an encoder 100 which comprises an input for receiving input blocks of frames or pictures of a video stream and an output for providing an encoded video bitstream. The term "frame" in this disclosure is used as a synonym for picture. However, it is noted that the present disclosure is also applicable to fields in case interlacing is applied. In general, a picture includes m times n pixels. These correspond to image samples and may each comprise one or more color components. For the sake of simplicity, the following description refers to pixels meaning samples of luminance. However, it is noted that the splitting approach of the present disclosure can be applied to any color component including chrominance or components of a color space such as RGB or the like. On the other hand, it may be beneficial to perform splitting for only one component and to apply the determined splitting to more (or all) remaining components.

The encoder 100 is configured to apply partitioning, prediction, transformation, quantization, and entropy coding to the video stream.

In a splitting unit 110, the input video frame is further split before coding. The blocks to be coded do not necessarily have the same size. One picture may include blocks of different sizes and the block rasters of different pictures of video sequence may also differ. In particular, each video image (picture) is at first subdivided into CTUs of the same fixed size. The CTU size may be fixed and predefined, for instance in a standard. In HEVC, size of 64×64 is used. However, the present disclosure is not limited to standardized and fixed sizes. It may be advantageous to provide a CTU size which may be set at the encoder and provided as a signaling parameter within the bitstream. For instance, different CTU sizes may be beneficial for the respective different picture sizes and/or content types. The CTU size may be signaled on any signaling level, for instance, it may be common for the entire video sequence or for its parts (i.e. a plurality of pictures) or individual per picture. Correspondingly, it may be signaled, for instance within a Picture Parameter Set, PPS or within a Sequence Parameter Set, SPS or within a Video Parameter Set, VPS which are known from the current codecs (H.264/AVC, H.265/HEVC) or similar parameter sets. Alternatively, it may be specified in a slice header or at any other level. The CTU size may take values different from 64×64. It may for instance be 128×128 samples large. In general, in order to perform hierarchic splitting by binary-tree of quad-tree, it may be beneficial to provide CTU size which is a power of two, i.e. in the format of $2^n$ with n being an integer larger than 2.

The partitioning of pictures into CTUs and the partitioning of CTUs into CUs are shown in FIG. 3 from *V. Sze et al (Ed.), High Efficiency Video Coding (HEVC): Algorithms and Architectures, Springer,* 2014. The partitioning follows a quad-tree structure in order to adapt to various local characteristics. On the left hand side, FIG. 3 shows a CTU split hierarchically in compliance with the quad-tree structure on the right hand side. In particular, the coding tree defines the syntax, which specifies the subdivision of the CTU into CUs. Similarly as a CTU, a CU consists of a square block of samples and the syntax associated with these sample blocks. Thus, the partitioning is performed hierarchically, starting from the CTU (hierarchy depth 0) which may be but does not have to be subdivided into four (in quad-tree) CUs of hierarchy depth 1. In FIG. 3, the CTU is split into CUs 8 and 16 of the first hierarchy depth (level), which are not further split and thus form leafs of the quad-tree as well as two further CUs, which are further split into CUs of hierarchy depth 2 (depth-2 CU). In particular, the top left depth-1 CU is further subdivided into depth-2 CUs 1, 2, 7 forming quad-tree leafs and another CU which is further split into depth-3 CUs 3, 4, 5, and 6 which are all leafs. Similarly, the bottom left depth-1 CU is further split into depth-2 CUs 13, 14, and 15, which are also leafs of the quad-tree and a remaining CU, which is further split into level-3 CUs 9, 10, 11, and 12 which are all leafs and thus, not further split.

An exemplary syntax for the quad-tree splitting in HEVC is shown below in Table 1.

TABLE 1

| Syntax for CTU splitting flags |
| --- |
| Descripton |

```
coding_quadtree( x0, y0, log2CbSize, cqtDepth ) {
    if( x0 + ( 1 << log2CbSize ) <= pic_width_in_luma_samples &&
        y0 + ( 1 << log2CbSize ) <= pic_height_in_luma_samples &&
        log2CbSize > MinCbLog2SizeY )
```

TABLE 1-continued

Syntax for CTU splitting flags

| | Descripton |
|---|---|
| split_cu_flag [ x0 ][ y0 ]<br>if( cu_qp_delta_enabled_flag && log2CbSize >= Log2MinCuQpDeltaSize ) {<br>  IsCuQpDeltaCoded = 0<br>  CuQpDeltaVal = 0<br>}<br>if( cu_chroma_qp_offset_enabled_flag &&<br>  log2CbSize >= Log2MinCuChromaQpOffsetSize )<br>  IsCuChromaQpOffsetCoded = 0<br>if( split_cu_flag[ x0 ][ y0 ] ) {<br>  x1 = x0 + ( 1 << ( log2CbSize − 1 ) )<br>  y1 = y0 + ( 1 << ( log2CbSize − 1 ) )<br>  coding_quadtree( x0, y0, log2CbSize − 1, cqtDepth + 1 )<br>  if( x1 < pic_width_in_luma_samples )<br>    coding_quadtree( x1, y0, log2CbSize − 1, cqtDepth + 1 )<br>  if( y1 < pic_height_in_luma_samples )<br>    coding_quadtree( x0, y1, log2CbSize − 1, cqtDepth + 1 )<br>  if( x1 < pic_width_in_luma_samples && y1 < pic_height_in_luma_samples )<br>    coding_quadtree( x1, y1, log2CbSize − 1, cqtDepth + 1 )<br>} else<br>  coding_unit( x0, y0, log2CbSize )<br>} | ae( v ) |

In particular, at the CTU level, a flag named split_cu_flag is included into the bitstream, which indicates whether the complete CTU forms a CU or whether it is split into four equally-sized blocks corresponding to square sample blocks. If the CTU is split, for each of the resulting blocks, another split_cu_flag is transmitted, specifying whether the block represents a CU or whether it is further split into four equally-sized blocks. This hierarchical subdivision is continued until none of the resulting blocks is further subdivided. The minimum size of CUs is signaled in the sequence parameter set, it can range from 8×8 luma samples to the size of the CTU, inclusive. When the minimum CU size is reached in the hierarchical subdivision process, no splitting flags are transmitted for the corresponding blocks; instead it is inferred that these blocks are not further split. In typical HEVC encoder settings, the maximum range of supported CU sizes is exploited so that CUs ranging from 8×8 to 64×64 samples can be used. The CUs inside a CTU are coded in a depth-first order. This coding order is also referred to as z-scan. It ensures that for each CU, except those located at the top or left boundary of a slice, all samples above the CU and left to the CU have already been coded, so that the corresponding samples can be used for intra prediction and the associated coding parameters can be used for predicting the coding parameters of the current CU.

In other words, the split_cu_flag[x0][y0] specifies whether a coding unit is split into coding units with half horizontal and vertical size. The array indices x0, y0 specify the location (x0, y0) of the top-left luma sample of the considered coding block relative to the top-left luma sample of the picture. When split_cu_flag[x0] [y0] is not present, the following applies at the decoder:

If log 2CbSize (parameter specifying coding block size) is greater than MinCbLog2SizeY (parameter specifying minimum configurable coding unit size), the value of split_cu_flag[x0] [y0] is inferred to be equal to 1.

Otherwise (log 2CbSize is equal to MinCbLog2SizeY), the value of split_cu_flag[x0][y0] is inferred to be equal to 0.

The array CtDepth[x] [y] specifies the coding tree depth for a luma coding block covering the location (x, y). When split_cu_flag[x0][y0] is equal to 0, CtDepth[x][y] is inferred to be equal to cqtDepth for x=x0 . . . x0+nCbS−1 and y=y0 . . . y0+nCbS−1.

FIG. 4 shows a mixed quad-tree and binary-tree partitioning. Quad-tree partitioning is indicated by solid lines whereas the binary-tree partitioning is indicated by dashed lines. The labels 1 or 0 on the nodes which represent coding units to be further split by the binary-tree indicate whether the binary splitting is applied vertically or horizontally, respectively.

The horizontal and vertical size of a video picture, in luma samples, has to be an integer multiple of the minimum CU size, in luma samples, transmitted in the sequence parameter set, but it does not need to be an integer multiple of the CTU size. If the horizontal or vertical size of the video pictures does not represent an integer multiple of the CTU size, the CTUs at the borders are inferred to be split until the boundaries of the resulting blocks coincide with the picture boundary. For this forced splitting, no splitting flags are transmitted, but the resulting blocks can be further split using the quad-tree syntax described above. The CUs that lie outside the picture area are not coded.

Figure 5:
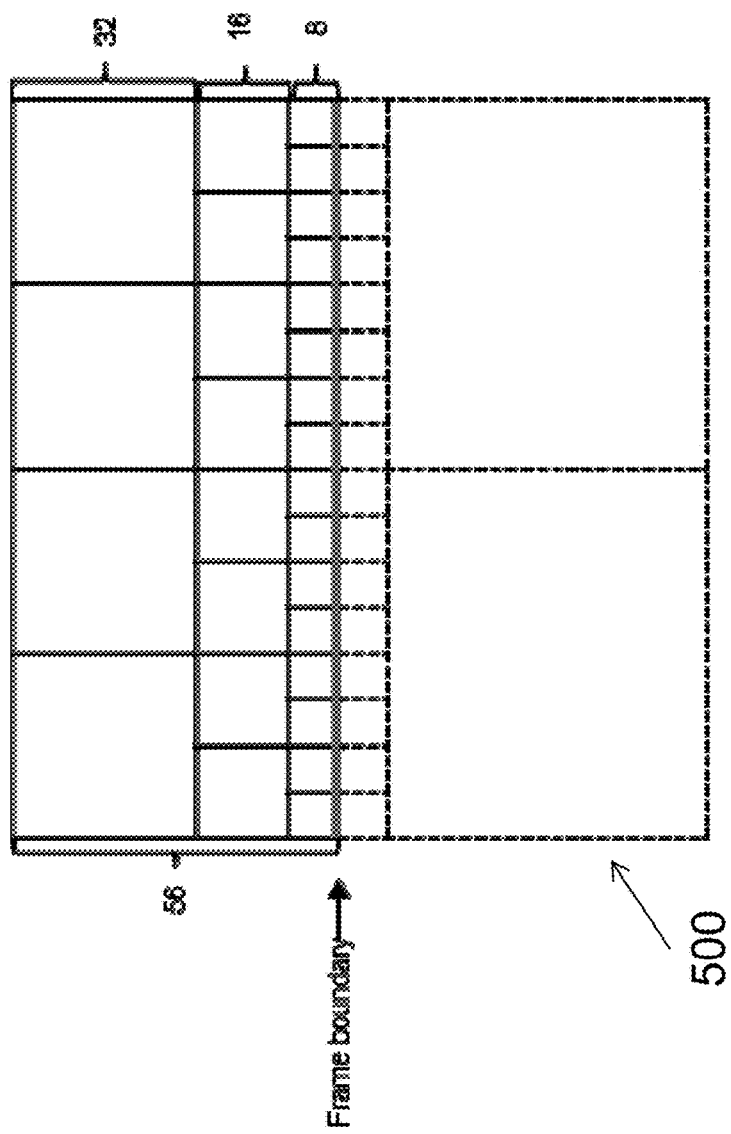
FIG. 5 is a schematic drawing illustrating forced quad-tree splitting of a boundary portion.

This splitting is illustrated in FIG. 5. In particular, FIG. 5 shows frame boundary above which 56 lines (128 samples long) are a boundary part of a slice or image. The part of the CTU below the frame boundary may belong to another slice or may not be present at all, e.g. if the frame boundary is the bottom picture boundary. As can be seen, forced quad-tree splitting is applied to the 128×56 samples.

The subdivision of the chroma CTBs is in HEVC always aligned with that of the respective luma CTBs. It is noted that the present disclosure may handle the chroma components in the same way, but is not limited thereto. There may also be an independent splitting of different color components.

After performing the image splitting in the splitting unit 110, the transformation, quantization, and entropy coding are carried out respectively by a transform unit 130, a quantization unit 140 and an entropy encoding unit 150 so as to generate as an output the encoded video bitstream.

The video stream may include a plurality of frames. The blocks of, for example, the first frame of the video stream are intra coded by means of an intra-prediction unit 190. An intra frame is coded using information from that frame only, so that it can be decoded independently from other frames. An intra frame can thus provide an entry point in the bitstream, e.g., for random access. Blocks of other frames of the video stream may be inter-coded by means of an inter prediction unit 195: each block of an inter-coded frame is predicted from a block in another frame (reference frame), e.g., a previously coded frame. A mode selection unit 180 is configured to select whether a block of a frame is to be intra predicted or inter predicted, i.e. whether it will be processed by the intra prediction unit 190 or the inter-prediction unit 195. The mode selection unit 180 also controls the parameters of intra of inter prediction. In order to enable refreshing of the image information, an inter-coded frame may comprise not only inter coded blocks, but also one or more intra coded blocks. Intra frames, in contrast, contain only intra coded and no inter coded blocks. Intra frames may be inserted in the video sequence (e.g., at regularly, that is, each time after a certain number of inter frames) in order to provide entry points for decoding, i.e. points where the decoder can start decoding without using information from preceding frames.

The intra prediction unit 190 is a block prediction unit. For performing spatial or temporal prediction, the coded blocks may be further processed by an inverse quantization unit 145, and an inverse transform unit 135. After reconstruction of the block by a reconstructor 125 a loop filtering unit 160 may be applied to further improve the quality of the decoded image. The reconstructor 125 adds the decoded residuals to the predictor to obtain reconstructed block. The filtered blocks then form the reference frames that are then stored in a frame buffer 170. Such decoding loop (decoder) at the encoder side provides the advantage of producing reference frames which are the same as the reference pictures reconstructed at the decoder side. Accordingly, the encoder and decoder side operate in a corresponding manner. The term "reconstruction" here refers to obtaining the reconstructed block by adding the decoded residual block to the prediction block.

The inter-prediction unit 195 receives as an input a block of a current frame or picture to be inter coded and one or several reference frames or pictures from the frame buffer 170. Motion estimation and motion compensation are performed by the inter prediction unit 195. The motion estimation is used to obtain a motion vector and a reference frame, e.g., based on a cost function. The motion compensation then describes a current block of the current frame in terms of the translation of a reference block of the reference frame to the current frame, i.e. by a motion vector. The inter prediction unit 195 selects a prediction block (i.e. a predictor) for the current block from among a set of candidate blocks (i.e. candidate predictors) in the one or several reference frames such that the prediction block minimizes the cost function. In other words, a candidate block for which the cost function is minimum will be used as the prediction block for the current block.

For instance, the cost function may be a measure of a difference between the current block and the candidate block, i.e. a measure of the residual of the current block with respect to the candidate block. For example, the cost function may be a sum of absolute differences (SAD) between all pixels (samples) of the current block and all pixels of the candidate block in the candidate reference picture. However, in general, any similarity metric may be employed, such as mean square error (MSE) or structural similarity metric (SSIM).

However, the cost function may also be the number of bits that are necessary to code such inter-block and/or distortion resulting from such coding. Thus, a rate-distortion optimization procedure may be used to decide on the motion vector selection and/or in general on the encoding parameters such as whether to use inter or intra prediction for a block and with which settings.

The intra prediction unit 190 receives as an input a block of a current frame or picture to be intra coded and one or several reference samples from an already reconstructed area of the current frame. The intra prediction then describes pixels of a current block of the current frame in terms of a function of reference samples of the current frame. The intra prediction unit 190 outputs a prediction block for the current block, wherein said prediction block advantageously minimizes the difference between the current block to be coded and its prediction block, i.e., it minimizes the residual block. The minimization of the residual block can be based, e.g., on a rate-distortion optimization procedure. In particular, the prediction block is obtained as a directional interpolation of the reference samples. The direction may be determined by the rate-distortion optimization and/or by calculating a similarity measure as mentioned above in connection with inter-prediction.

The difference between the current block and its prediction, i.e. the residual block, is then transformed by the transform unit 130. The transform coefficients are quantized by the quantization unit 140 and entropy coded by the entropy encoding unit 150. The thus generated encoded video bitstream comprises intra coded blocks and inter coded blocks and the corresponding signaling (such as the mode indication, indication of the motion vector, and/or intra-prediction direction). The transform unit 130 may apply a linear transformation such as a discrete Fourier transformation (DFT) or a discrete cosine transformation (DCT). Such transformation into the spatial frequency domain provides the advantage that the resulting coefficients have typically higher values in the lower frequencies. Thus, after an effective coefficient scanning (such as zig-zag), and quantization, the resulting sequence of values has typically some larger values at the beginning and ends with a run of zeros. This enables further efficient coding. The quantization unit 140 performs a lossy compression by reducing the resolution of the coefficient values. Entropy coding unit 150 then assigns binary codewords to coefficient values. The codewords are written to a bitstream referred to as the encoded bitstream. The entropy coder also codes the signaling information (not shown in FIG. 1) which may include coding according to the splitting flag syntax shown above.

Figure 2:
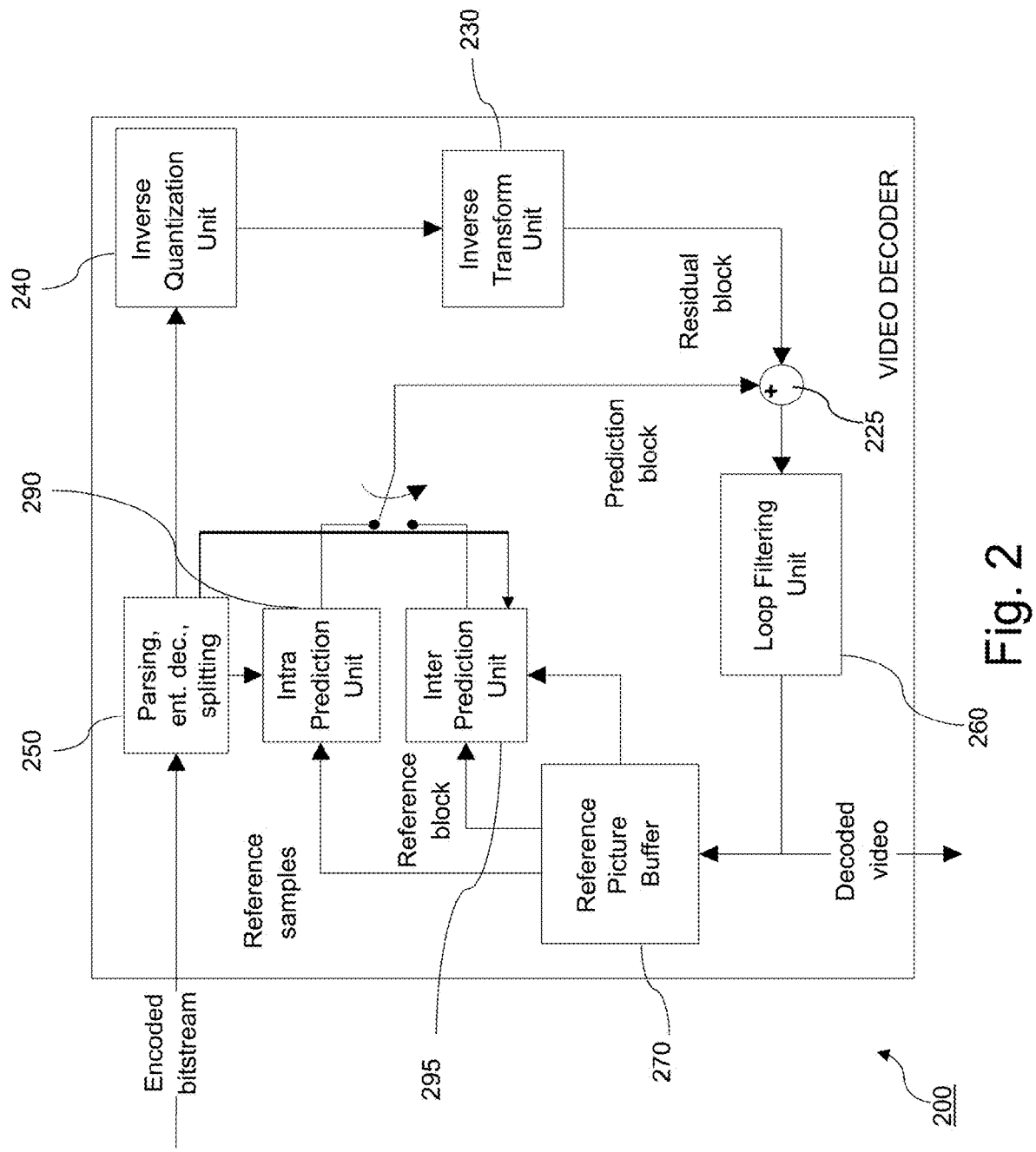
FIG. 2 is a block diagram showing an exemplary structure of a video decoder.

FIG. 2 shows an example of a video decoder 200. The video decoder 200 comprises particularly a reference picture buffer 270 and an intra-prediction unit 290, which is a block prediction unit. The reference picture buffer 270 is configured to store at least one reference frame reconstructed from the encoded video bitstream of the encoded video bitstream. The intra prediction unit 290 is configured to generate a prediction block, which is an estimate of the block to be decoded. The intra prediction unit 290 is configured to generate this prediction based on reference samples that are obtained from the reference picture buffer 270.

The decoder 200 is configured to decode the encoded video bitstream generated by the video encoder 100, and preferably both the decoder 200 and the encoder 100 generate identical predictions for the respective block to be encoded/decoded. The features of the reference picture buffer 270 and the intra prediction unit 290 are similar to the features of the reference picture buffer 170 and the intra prediction unit 190 of FIG. 1.

The video decoder 200 comprises further units that are also present in the video encoder 100 like, e.g., an inverse quantization unit 240, an inverse transform unit 230, and a loop filtering unit 260, which respectively correspond to the inverse quantization unit 140, the inverse transform unit 150, and the loop filtering unit 160 of the video coder 100.

A bitstream parsing, entropy decoding and splitting unit 250 is configured to parse and decode the received encoded video bitstream to obtain quantized residual transform coefficients and signaling information. The quantized residual transform coefficients are fed to the inverse quantization unit 240 and an inverse transform unit 230 to generate a residual block. The residual block is added to a prediction block in a reconstructor 225 and the resulting sum is fed to the loop filtering unit 260 to obtain a decoded video block. Frames of the decoded video can be stored in the reference picture buffer 270 and serve as reference frames for inter prediction. The signaling information parsed and decoded from the bitstream may generally include control information related to frame partitioning. In order to further correctly parse and decode the image, the control information is used to recover splitting of the image into coding units in order to correctly assign the following decoded data to the respective coding units.

Generally, the intra prediction units 190 and 290 of FIGS. 1 and 2 can use reference samples from an already encoded area to generate prediction signals for blocks that need to be encoded or need to be decoded.

The bitstream parsing, entropy decoding and splitting unit 250 receives as its input the encoded bitstream. The bitstream may first be parsed, i.e. the signaling parameters and the residuals are extracted from the bitstream. The syntax and semantic of the bitstream may be defined by a standard so that the encoders and decoders may work in an interoperable manner.

The present disclosure presents new approach of boundary forced partition in block-based hybrid video coding. In particular, boundary forced partitioning is performed at least partially by using binary tree (BT) structure. Since, according to observation of the Inventors, most boundary blocks may use same prediction mode, the forced quad-tree (QT) partitions for the CTUs on the frame boundaries are not always necessary. Instead of forced QT partition, in one embodiment, forced horizontal BT for the bottom boundary portion and/or forced vertical BT for the right boundary portion are introduced (assuming top and left neighbors are already reconstructed in the CTU processing order from left to right and from top to bottom).

Figure 6:
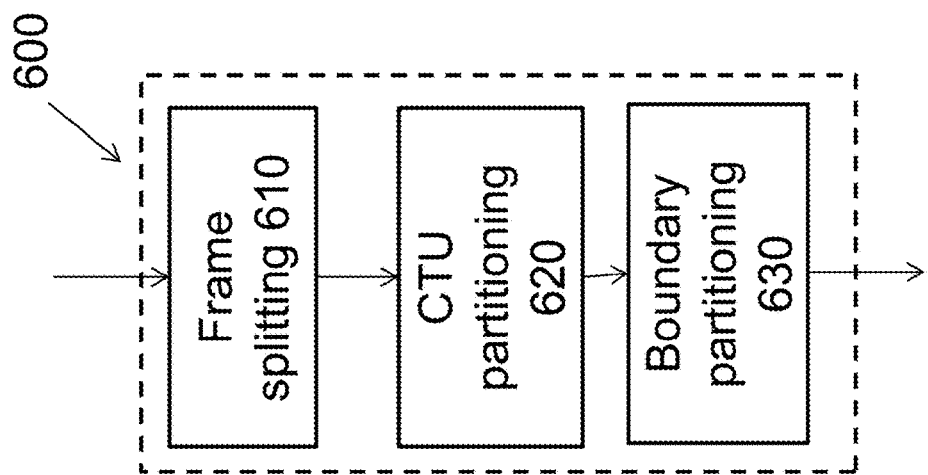
FIG. 6 is a block diagram illustrating an example of an apparatus which may operate as splitting unit in encoder or decoder.

In particular, as shown in FIG. 6, according to an embodiment, an apparatus 600 (which may be implemented in units 110, 250 described above) for splitting 610 an image portion into coding units including a processing circuitry which, in operation subdivides the image portion into an integer number of coding tree units with a predetermined size and a boundary portion with a size smaller than the predetermined size in at least a first direction which is either horizontal or vertical direction. Moreover, the processing circuitry, in operation, partitions 630 the boundary portion hierarchically into coding units including a deepest coding unit with different sizes in respective horizontal and vertical directions, the deepest coding unit being smaller in the first direction.

The CTUs obtained by the frame splitting 610 may be further hierarchically partitioned 620. This partitioning may be performed in any way, for instance as illustrated in FIGS. 3 and 4 and described with reference to them above.

FIG. 6 shows inner structure of the circuitry of the apparatus 600. This circuitry may be any kind of hardware and software with functional units 610, 620, and 630 for the respective splitting of frame into CTUs, partitioning of the CTUs and partitioning of the boundary portion. These units may be implemented, for instance, on a single processor. However, the invention is not limited to such application and these units may be implemented by separate hardware parts as well.

The boundary portion may be located only at a vertical boundary (if the size of the picture in vertical direction is not integer multiple of the vertical CTU size) or only at a horizontal boundary (if the size of the picture in horizontal direction is not integer multiple of the horizontal CTU size) or at both the vertical and horizontal boundary (if the size of the picture in horizontal as well as vertical direction is not integer multiple of the respective horizontal and vertical CTU sizes).

Figure 7:
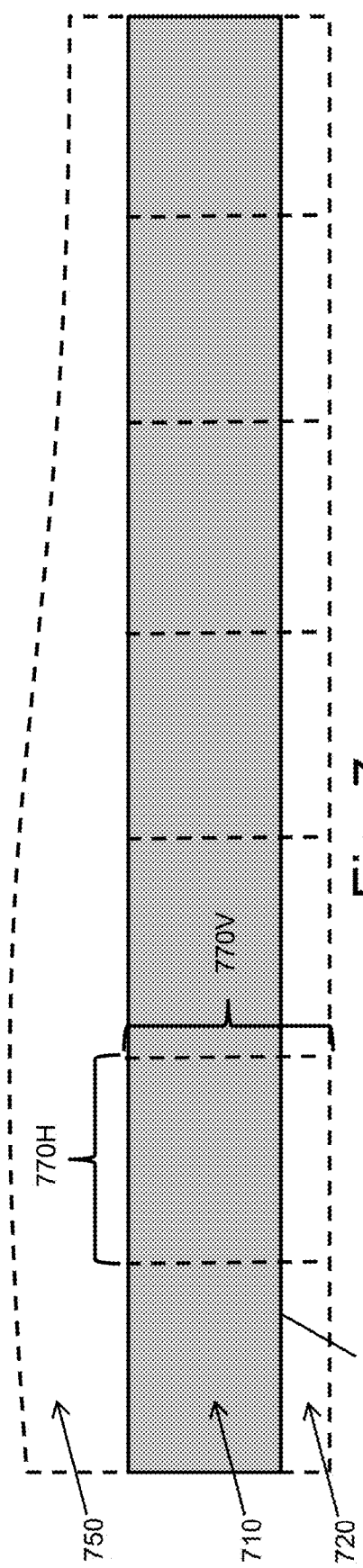
FIG. 7 is a schematic drawing illustrating boundary portion splitting.

Usual pictures to be coded have a size being multiple of CTUs. FIG. 7 visualizes an example of a bottom picture boundary 700 and the corresponding boundary portion 710 (shaded). Portion 750 illustrates the remaining portion of the image with size in integer multiple of CTUs vertically and horizontally. In particular, the vertical size of a CTU is denoted as 770V whereas the horizontal size of the CTU is denoted as 770H. As can be seen in FIG. 7, the boundary portion in this example is an integer multiple of CTU size 770H in horizontal direction. However, in vertical direction, the boundary portion 710 has a size of a reminder after division of the vertical picture size by the vertical CTU size 770V. Portion 720 is only virtual and shows the difference between the height of the boundary portion and CTU size. It is noted that in present implementations the CTU is square so that the sizes 770H and 770V are the same. However, the present disclosure is not limited thereto and the vertical and horizontal sizes of the CTU may differ.

In order to encode (and correspondingly decode) the boundary portion, the boundary portion 710 in FIG. 7 is split into incomplete CTUs, i.e. into portions which have horizontal size of the CTU 770H and vertical size smaller than the CTU size 770V. These incomplete CTUs are further forced-partitioned as is shown in FIG. 8.

Figure 8:
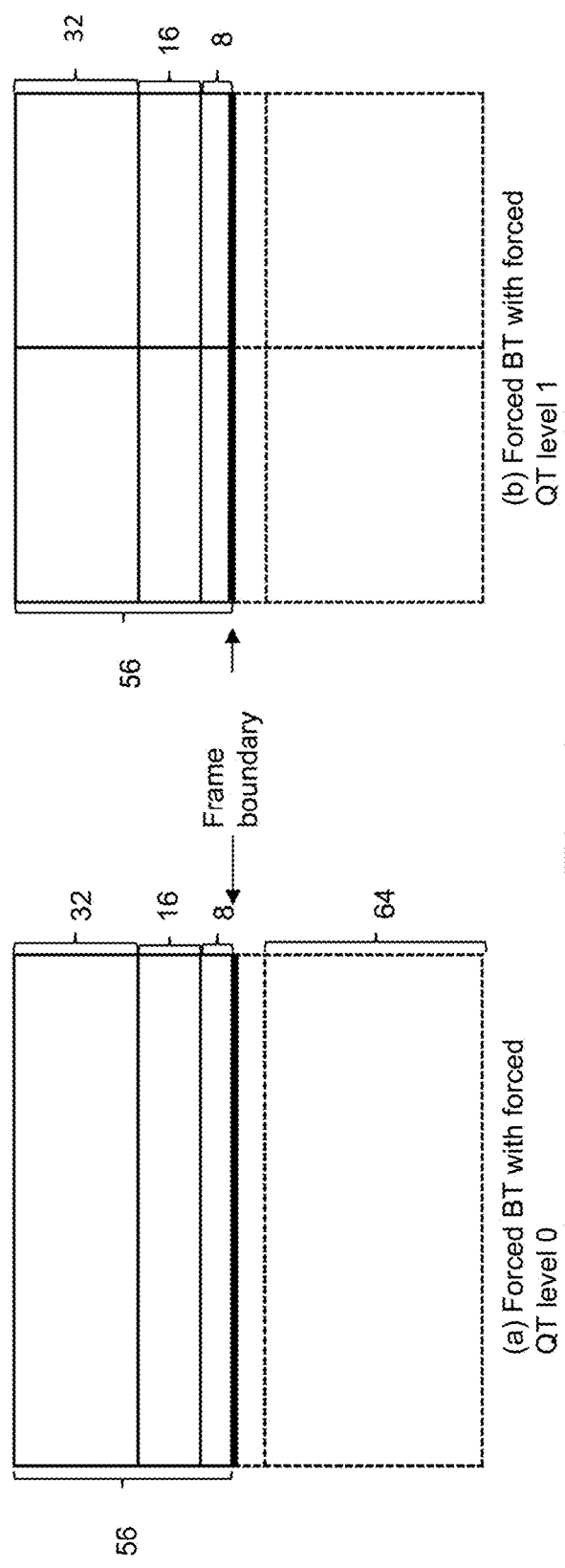
FIG. 8 is a schematic drawing showing examples of forced binary-tree splitting of a vertical boundary.

FIG. 8 shows examples in which the boundary portion is at the horizontal boundary, so that the splitting takes place in vertical direction. In particular, on the left hand side of FIG. 7, a boundary portion is shown corresponding to the width of a CTU (in this example it is 128 samples) but a height smaller than the height of the CTU (only 56 samples). The vertical boundary is forced-partitioned by binary tree splitting. In particular, the largest unit size fitting into the 56 samples length is the depth-2 unit of size 32 samples, since the depth-1 unit with 64 samples does not fit the 56 samples high boundary portion. The remaining 24 samples are further split in the depth-3 unit of size 16 samples and the remaining part of 8 samples (corresponding to depth-4 CU size) which reaches up to the picture boundary so that no further splitting is necessary. In this example, no splitting is applied on the horizontal boundary. In summary, the boundary portion unit with a size of a CTU in one direction and a smaller size in another direction is partitioned by binary tree splitting, i.e. by dividing the boundary portion unit hierarchically into two portions of which one has a size of the next shallowest CU which fits into the smaller size and a remaining portion which is further split until the deepest CU reaches the frame boundary. This partitioning of the 128×56 large CTU portion results here in 3 boundary portion coding units with the respective sizes of 128×32, 128×16 and 128×8.

In summary, according to one implementation, the processing circuitry is configured to partition boundary portion in all partitioning levels by binary tree splitting.

On the right hand side of FIG. 8, an example of partitioning is shown in which at first a quad-tree partitioning is applied in hierarchy depth 1 (hierarchy depth 0 corresponding to CT size) resulting in two CUs of size 64×56 which are further binary-tree-split into respective pairs of 64×32, 64×16, and 64×8 large CUs.

The examples in FIG. 8 show partitioning of the bottom boundary. However, the present disclosure is equally applicable to splitting of any other boundary such as the right boundary. If the subdivision of the picture into CTUs is performed from left to right and from top to bottom, then the boundary portions would be on the bottom and/or on the right side of the picture. However, the partitioning might also be done from the bottom to the top and from right to left, in which case the top and left boundary would need to be split, which is possible in the same way as described with reference to FIG. 8. Similarly, the above example shows partitioning of the incomplete CTU starting from the top of such CTU. However, in general, it is also possible to split the incomplete CTU from the picture (frame) boundary to the top.

As shown on the right side of FIG. 8, the incomplete CTU splitting may be a mixed QT and BT splitting. The processing circuitry may be configured to partition the boundary portion by binary tree splitting at least in the deepest partitioning level. This provides an advantage that the larger boundary concurring with the frame boundary does not have to be split into the smallest units. Too many too small CUs at the frame boundary may result in more coding complexity as well as larger bitstream. It is noted that in this embodiment, as long as the deepest CU has one side larger than the other side (i.e. results from binary tree partitioning) the remaining depth hierarchies may be determined in any way and do not need to be forced in a predefined manner. Rather, the partitioning may be done by RD-optimization and accompanied by the corresponding control information enabling the decoder to recover the same partitioning. The partitioning may also by partly forced and partly available for RD-optimization.

In other words, the processing circuitry can be configured to partition the boundary portion also by quad-tree splitting. Thus, there may be a forced QT or BT partitioning predefined for each depth defined by a standard or configurable by control information included in the bitstream.

For instance, forced BT partition is only done after a certain number of forced QT levels. This may be achieved in that the processing circuitry is configured to partition the boundary portion by quad-tree splitting in N shallowest levels, N being an integer larger than or equal to zero and smaller than the number of partitioning hierarchy levels. The processing circuitry is further configured to partition the boundary portion by binary tree splitting in the remaining partitioning hierarchy levels. When referring to FIG. 8, on the left hand side there is no QT splitting performed.

Control information in the bitstream may thus include a QT/BT indicator specifying whether or not a QT is applied and if affirmative, how many levels are QT-split. Such QT/BT indicator may correspondingly take a plurality of values such as value 0 if no QT splitting is applied (as shown in FIG. 8 on the left hand side) and values corresponding to N. Such signaling is shorter than signaling for each CU in each level whether QT, BT or no partitioning is applied. However, the present disclosure may use any kind of signaling.

Alternatively, or in combination with control signaling, the levels of forced QT can be adaptively selected by temporal ID or slice type. This approach provides the advantage that no explicit signaling (or smaller amount of explicit signaling) is required. Still, the forced partitioning may be set adaptively at least with respect to the type of prediction.

HEVC specifies a temporal identifier (ID), which indicates a level in a hierarchical temporal prediction structure (dependency between inter-predicted frames). Slice type can be such as intra-predicted slice, inter-predicted slice only applying prediction based on one reference picture, inter-predicted slice applying bi-directional prediction or the like.

For example, if the temporal identifier is 0 (meaning I picture) or if the slice type is intra-predicted slice, the partitioning need to be more accurate than for a higher temporal ID (inter-predicted picture) or for the P/B slices (inter-predicted slices).

The above parameters temporal ID or slice type are only exemplary. In general, further and/or different coding parameters can be applied. Moreover, instead of the slice type, the prediction mode of the CUs in the neighboring CTU may be used to determine the boundary portion partitioning on CTU (incomplete boundary CTU) basis.

On the other hand, signaling the partitioning may provide more freedom to choose the appropriate splitting so that overall coding efficiency is increased. For example, the partitioning can be adjusted by optimizing cost function (e.g. by RD-optimization) and signaled in the bitstream to indicate how many levels of forced QT are used for the decoder (i.e. signaling whether QT is used at all or signaling N as mentioned above).

Alternatively, the boundary (incomplete) CTUs are at first partitioned by RD-optimization up to the last but one hierarchy level (depth) or up to a signaled hierarchy level M. The remaining deepest-level blocks located on the frame boundary then use the forced BT partitioning or combination of forced QT and forced BT partitioning.

Figure 9:
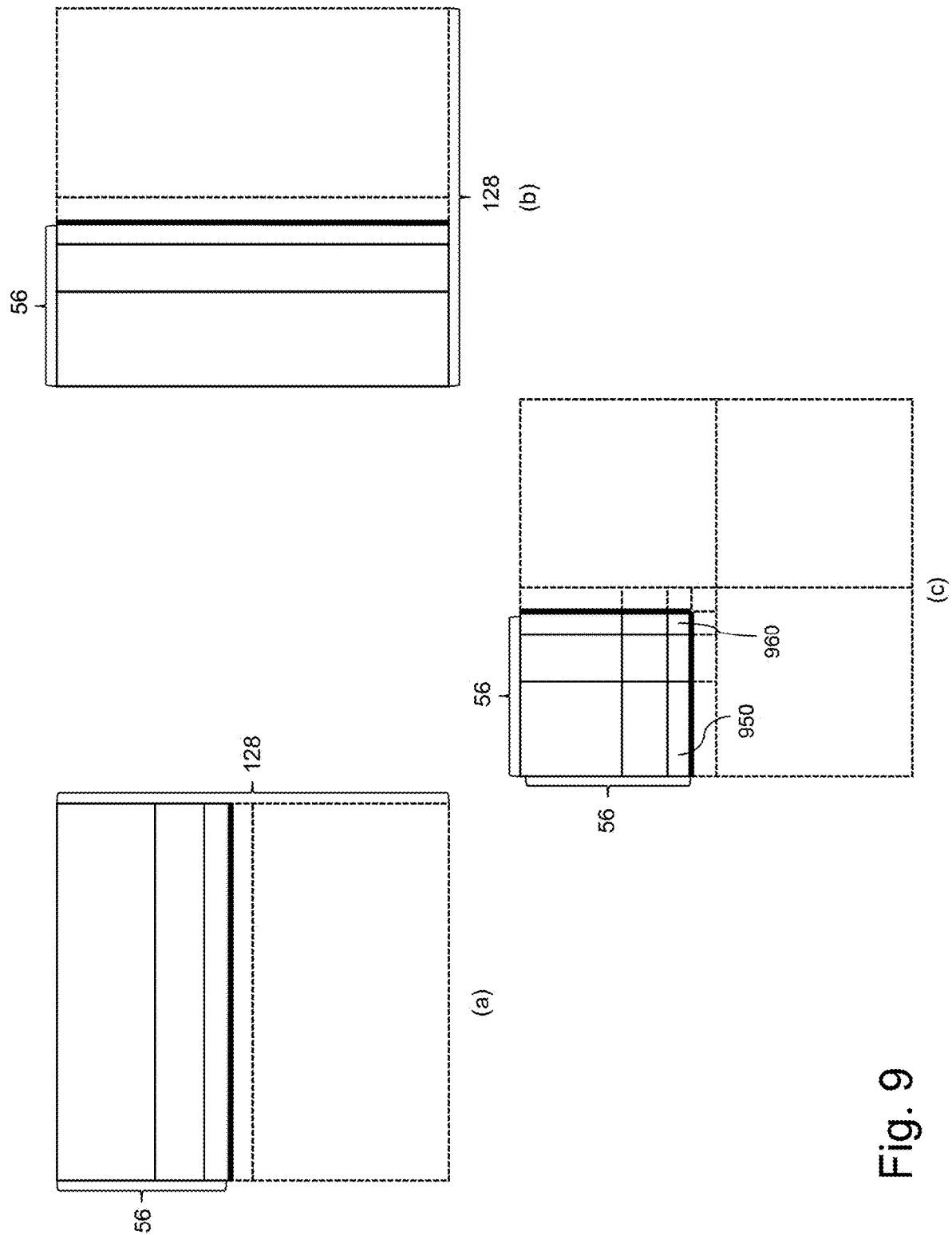
FIG. 9 is a schematic drawing illustrating examples of partitioning on vertical, horizontal and combined boundary.

FIG. 9 shows three examples of at least partly forced boundary partitioning.

When the CTU/CU is located on the bottom boundary, horizontal forced BT partitioning may be used without RD-optimization and without partition flag signaling recursively (by splitting vertical boundary). The forced horizontal BT partition is terminated when the right bottom sample of the leaf nodes is located within the slice/picture bottom boundary. After forced horizontal BT partitioning, the forced partitioned CUs from the boundary CTU are possibly further split based on RD-cost at the encoder, and a further split flag may be signaled from the encoder to the decoder. FIG. 9, part (a) shows an example of 128×56 samples bottom boundary partitioned by forced horizontal BT (i.e. splitting of the vertical boundary).

Similarly, for the CTU/CU located on the right boundary, vertical forced BT partitions are used possibly without RD cost check and without split flag signaling recursively until the right bottom sample of the leaf nodes is located within the slice/picture right boundary. After forced vertical BT partitioning (of the horizontal boundary), the forced partitioned CUs from the boundary CTU are possibly further split by RD-optimization at the encoder and a further split flag is signaled from the encoder to the decoder. FIG. 8, part (b) shows an example of 56×128 samples long right boundary partitioned by forced horizontal BT.

According to another example, for the right bottom corner boundary located CTU/CU, first the forced hierarchical QT partitioning is used without any signaling, recursively. When the right bottom sample of the current CU is located on the bottom or right boundary, further forced horizontal or vertical BT partitioning is operated recursively until the right bottom samples of the leaf nodes are located inside of the slice/picture boundary. Otherwise, when the right bottom sample of the current CU is still located on the corner boundary, further forced QT partition will be used until the right bottom samples of the leaf nodes are within the slice/picture frame. The forced partitioned CUs obtained by splitting from the boundary CTU are possibly further split by RD-optimization at the encoder and a further split flag may be signaled from the encoder to the decoder. FIG. 9, part (c) shows the example of 56×56 samples right bottom corner boundary partitioned by forced QT and BT.

In particular, in FIG. 9, part (c), the incomplete corner boundary CTU of 56×56 samples is shown. The first depth level of 64×64 samples after QT splitting is not within the boundary portion. The second depth level 32×32 samples after QT is within the boundary portion but leaves a horizontal (left bottom CU of 32×24 samples), a vertical (right top CU of 24×32 samples) and another corner portion (right bottom CU of 24×24 samples) to be further split.

In this example, the horizontal and the vertical boundary CUs are further binary-tree split so that the deepest level units have a longer side along the picture/slice boundary. The corner portion may be further split in the same way as the described for the higher-level corner portion above, i.e. by quad-tree splitting.

In other words, the processing circuitry, in operation, may partition the boundary portion by binary tree splitting in horizontal and in vertical direction. This is especially the case if the boundary portion extends along both picture/slice boundaries, the vertical and the horizontal and includes the corner portion.

For the corner case, the processing circuitry, in operation, partitions in each hierarchy level a corner portion of the boundary portion by quad-tree splitting. For instance, in FIG. 9, part (c), a corner in both sides having the size of 56 samples, for the corner boundary CU 960, four levels forced QT are needed (QT splitting of the 128×128 CTU resulting in four 64×64 CUs with the top left CU including the 56×56 corner; QT splitting of the 64×64 CU top left resulting in four 32×32 CUs with the bottom right CU including the 24×24 corner; QT splitting the 32×32 CU bottom right resulting in four 16×16 CUs, the bottom right of them including the 8×8 corner and the final step of QT splitting of the bottom right 16×16 incomplete CU to four 8×8 CUs, i.e. minimum size partitions among which the top left partition is located in the picture while the others are not).

On the other hand, for the bottom boundary CU 950, two levels of forced QT and afterwards two levels forced BT are needed (QT splitting of the 128×128 CTU, QT splitting of the 64×64 CU top left, binary splitting of the 32×32 CU including the 32×24 boundary portion to two 32×16 CUs on the bottom boundary; and the final step of BT splitting the bottom 32×16 CU to two 32×8 CUs of which only the upper one is within the picture boundary).

Figure 10:
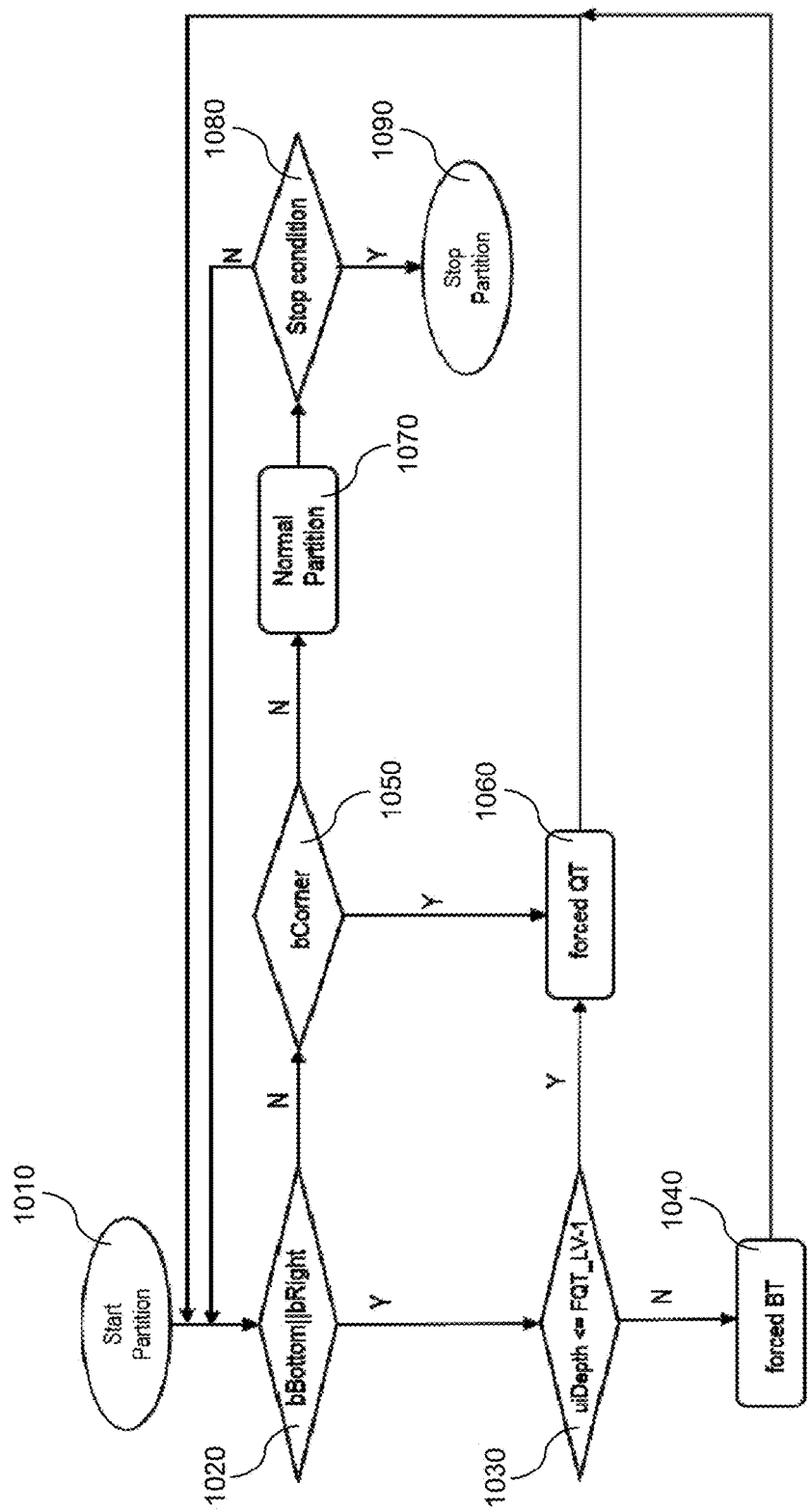
FIG. 10 is a flow diagram showing an exemplary partitioning syntax decisions.

For the corner CU 960 the set QT level N will be not taken into account and the corner CU will be forced split by the QT in all hierarchy levels. In particular, in the corner case, if the right bottom sample of the leaf node (incomplete CU, meaning located partially within boundary portion) is located outside of both the right boundary and bottom boundary, this current incomplete CU will be recognized as bCorner (FIG. 10, step 1050, "Yes"). If bCorner is true for the current CU, the current CU will be further split using forced QT. The partitioning ends when a leaf node resulting from the splitting is completely inside of the boundary portion or if the corner portion becomes a bottom or right boundary case (bBottom, bRight, which means the right bottom boundary of the current CU is located either only outside the bottom or right boundary of the boundary portion, i.e. the picture or slice.

In this example, if N=0 or 1 or 2, the forced QT splitting scheme will be same, because the CU 960 always need forced QT and the CU 950 will be split by QT in the first two levels anyhow. This is because the CU of the depth 0 (CTU), CU of the depth 1 (64×64 samples) are still corner CUs. Only after splitting of the 64×64 CU, in depth 2, there are four CUs of which one is not a boundary CU at all (top left), two are bottom-boundary and right boundary CUs and only one is corner CU.

If N=3, one more forced QT would be needed and then the forced splitting scheme would be changed for the CU 950, so that the bottom left 32×32 CU would be further QT-split instead of BT-split. The splitting of CU 960 remains the same.

According to the present disclosure, a combination of forced QT and forced BT may be used as already briefly discussed above. In particular, for some complex texture or motion on the boundary, detailed partition may be beneficial for image quality. Therefore, combined forced partitioning by QT and BT is also provided. In particular, in one combination of forced QT and forced BT implementation, forced BT partition is only applied after a certain number N of forced QT levels. If under other setting QT partitioning is allowed after BT partitioning, forced QT partitioning is possible operated after forced BT.

In the forced BT and forced QT combined implementation, there are several ways to define the number of forced QT levels. If pre-defined forced QT level is used, all boundary CTUs will first be forced partitioned with same QTBT structure, further partition is possible based on RD-optimization. FIG. 8 on the right hand side illustrates the example of one level QT and three levels BT partitioning of 128×56 samples bottom boundary in an incomplete 128×128 CTU.

The levels of forced QT can be adaptively selected by encoder parameters such as temporal ID or slice type. Certain slice type or lower temporal ID may need more detailed partition. Furthermore, the levels of forced QT may be adjusted by rate-distortion optimization and signaled in the bitstream to indicate how many levels of forced QT are used. A level number signaling in the CTU level can be used to indicate how many levels of forced QT has been used for a CTU. In addition, a level number signaling in slice header can be used to indicate how many levels of forced QT has been used for the current slice. A level number signaling in SPS can be used to indicate how many levels of forced QT have been used for a coded video sequence. A level number signaling in PPS can be used to indicate how many levels of forced QT has been used for a coded picture.

The number of levels of forced QT may also be determined based on any other approach. For instance, entropy of the original samples within the slice/frame/boundary region may be used. Entropy is calculated by summing up terms $p\_i * \log 2(p\_i)$ over i, wherein $p\_i$ is a probability of sample Intensity value I in the certain region. The sign "*" means multiplication, "log 2" means logarithm with base 2. The higher the entropy, the more structure is likely present in the slice/frame/boundary region and thus, the smaller CUs may be appropriate. However, these are only examples and in principle, the present invention is not limited to any particular way in which the number of forced QT levels is determined. Any other measures such as variance of presence of edges may be used.

The processing circuitry, in operation, partitions the boundary portion until the deepest-level coding unit remains in the boundary portion.

According to the present disclosure, a method is provided for splitting an image portion into coding units. The method includes subdividing the image portion into an integer number of coding tree units with a predetermined size and a boundary portion with a size smaller than the predetermined size in at least a first direction which is either horizontal or vertical direction. Then partitioning of the boundary portion hierarchically into coding units is performed including a deepest coding unit with different sizes in respective horizontal and vertical directions, the deepest coding unit being smaller in the first direction.

In one implementation, the partitioning of the boundary portion further comprising the steps of: starting with a current partitioning level being the shallowest partitioning level; sequentially splitting the boundary portion to coding units of the current partitioning level, as long a coding unit of the current partitioning level does not reach the boundary portion; as soon as the coding unit of the current partitioning level does not fall within the boundary portion, increase the partitioning level and further partition said coding unit, wherein a quad-tree partitioning is used for N shallowest partitioning levels and binary tree partitioning is used otherwise.

The sequential splitting means that the splitting is performed from the shallowest level until the deepest level. In particular, the forced splitting is performed in each hierarchy level for a coding unit which is located on the boundary (a boundary CU), meaning that such CU includes samples within the picture/slice boundary (within the boundary portion) and a part located outside the picture/slice boundary. Here the term CU refers to the CU with the size resulting from the partitioning which, however, is incomplete since it includes less samples than given by its size, i.e. it is partly located out of the picture/slice partitioned.

The forced splitting is thus performed in order to partition the boundary portion roughly from the largest CUs till the smallest CUs so that the entire boundary portion is split. No partitioning information is necessary for the forced splitting, it can be predefined, as already discussed above. N may be signaled or pre-defined, if there are some QT levels forced. The pre-defined N means that encoder and decoder both have a knowledge of such N which may be defined by standard, for instance.

However, after performing the forced splitting, the forced-split boundary portion CUs may be further partitioned. This may be performed based on the rate-distortion optimization and thus, also signaled in the bitstream. In particular, for the CUs in the boundary portion, which are larger than the minimum CU size, a split flag or a plurality of split flags may be signaled which indicate whether or not and how such CU is further partitioned.

It is noted that the partitioning information included into the bitstream may include a QT splitting flag and/or BT splitting flag. QT and BT splitting may also be mixed as long as it is signaled or derivable, which of the two kinds of splitting is used. At the decoder side, after forced splitting, then the further splitting is done based on the decoded partitioning information such as qt_split_cu_flag and bt_split_cu_flag. FIG. 10 shows a detailed exemplary implementation of a boundary partitioning and, in particular, of forced BT and the combination of forced QT and forced BT implementation. The variables employed in the figure have the following meaning:

bBottom indicates whether the right bottom sample of current CTU or CU is located outside of the bottom boundary.

bRight indicates whether the right bottom sample of current CTU or CU is located outside of the right boundary.

bCorner indicates whether the right bottom sample of current CTU or CU is located outside of the right bottom corner boundary.

FQT_LV indicates the levels of forced QT before forced BT is done (corresponds to N described above).

uiDepth indicates the currently partitioned hierarchy level.

As mentioned above, the levels of forced QT could be pre-defined, adaptively selected based on encoder parameters such as slice type/temporal ID or based on RD cost.

In particular, in step 1010 the partitioning of a boundary portion CTU (level 0) starts. If the CTU is a CTU on the bottom or right boundary (but not corner boundary) in step 1020, and if uiDepth is not greater than FQT_LV−1, the CTU is split in step 1040 by forced BT. Otherwise, the forced-QT partitioning step 1060 is applied. The splitting continues by further splitting the boundary portion CU(s). For instance, in the example of FIG. 8 (*b*), the CTU (level 1) FQT_LV equal to 1. Since uiDepth=0 is equal to the FQT_LV−1=0, in step 1030 the incomplete CTU would be forced-split by QT in step 1060, resulting in two CUs (top left and right) which need to be further split. Each of these CUs would be further recursively partitioned. The top left CU (level 1) is still incomplete and thus boundary portion CU. As bottom boundary CU in step 1020, and since uiDepth=1 is larger than FQT_LV−1=0 in step 1030, forced BT would applied in step 1040 to the top left CU. The top right CU would be partitioned in the same way. The boundary portion (incomplete) CUs (64×24) would be further split in level 2 by BT in step 1040. The remaining 64×8 CU in level 3 would reach the picture boundary and thus result in "No" in steps 1020 and 1050. The partition of size 8 as the minimum partition would not be further split in step 1070 but rather result in "yes" in step 1080 and thus stop of partitioning in step 1090. The second 64×24 CU would be split in the same way.

On the other hand, the 56×56 CTU of part (c) in FIG. 9 is a corner CTU. In step 1020 (level 0), the CTU would pass to step 1050 and as a corner CU would be partitioned by QT in step 1060. In level 1, the top left 56×56 CU would be handled in the same way resulting in three boundary CUs (bottom left, top right and corner). When assuming FQT_LV=0 meaning that there is no forced QT splitting for the bBottom and bRight CUs, the bottom left and top-right CUs would be split by forced BT in step 1040 (after "yes" in step 1020 and "no" in step 1030). The corner 24×24 CU (level 2) would pass step 1020 to step 1050 and be partitioned by QT in step 1060 resulting again into three boundary CUs with sizes 16×8, 8×8 and 8×16, which would not need to be further split, and pass step 1020 with "no", step 1050 with "no" and over step 1070 to stop condition 1080 and the end 1090. The stop condition may be, for instance, a minimum size, in this example equal to 8.

In the following Table 2 shows an exemplary syntax which enables to signal QT split flag for the normal (not boundary) CUs. In addition, BT split flag may be signaled for the CUs other than boundary portion CUs. The syntax of the coding_quadtree is recursive, i.e. the partitioning is hierarchical. The partitioning is performed if the following conditions are true:

x0+cuWidth<=pic_width_in_luma_samples
and
y0+cuHeight<=pic_height_in_luma_samples.

In other words, as long as the bottom right corner of the current CU (i.e. CU currently processed by splitting) is within the picture, the CTU/CU is split by quad-tree or binary tree. It is noted that this syntax is only exemplary and that the present disclosure may also be applied to other cases such as using only QT or only BT or selectable further partitioning types for the CTUs which are completely within the picture/slice. Values cuMinBTSiz, cuMaxBTSize and cuMaxBTDepth employed in the syntax are predefined value.

In the above conditions, x0 and y0 specify the top left corner sample location of the current CU, cuWidth and cuHeight specify the horizontal and vertical CU size and parameters pic_width_in_luma_samples and pic_width_in_luma_samples specify the horizontal and vertical picture size. It is noted that in this example the entire picture is partitioned. However, the same approach is applicable to independently decodable picture portions such as slices, tiles or any other picture portions with boundaries.

Similar to the HEVC standard, when qt_split_cu_flag[x0][y0] is not present (boundary case), the following applies (at the encoder and decoder):

If cuWidth (width of the current-level CU) is greater than MinQTSize (minimum QT size, here 8) and cuHeight (height of the current-level CU) is greater than MinQTSize, the value of qt_split_cu_flag[x0][y0] is inferred to be equal to 1. In other words, the boundary is forced split.

Otherwise (log 2CbSize is equal to MinCbLog2SizeY), the value of qt_split_cu_flag[x0][y0] is inferred to be equal to 0. In other words, if the current CU has the minimum allowed size MinCbLog2SizeY, the decoder assumes that the CU is no more split.

This is similar to the case of Table 1 above.

TABLE 2

Exemplary syntax of forced BT and forced QT plus forced BT implementation based on syntax shown in Table 1 ( emphasizedby gray shading ).

| | Description |
|---|---|
| coding quadtree( x0, y0, cqtDepth, cuWidth, cuHeight ) { | |
|     if( CTUSize >> cqtDepth == cuWidth && uiWidth == uiHeight ) { | |
|         If ( x0 + cuWidth <= pic_width_in_luma_sample && y0 + cuHeight <= pic_height_in_luma_ samples ) { | |
|             qt_split_cu_flag[ x0 ][ y0 ] | ae( v ) |
|         } | |
|     } | |
| . . . | |
|     if( qt_split_cu_flag [ x0 ][ y0 ] && ( ( bBBoundary \|\| bRBoundary )? cqtDepth <= FQT_LV-1 : true ) ) ) { | |
|         x1 = x0 + cuWidth >> 1 | |
|         y1 = y0 + cuHeight >> 1 | |
|         coding_quadtree( x0, y0, cqtDepth + 1, cuWidth>>1, cuHeight>>1 ) | |
|         if( x1 < pic_width_in_luma_samples ) | |
|         coding_quadtree( x1, y0, cqtDepth + 1, cuWidth>>1, cuHeight>>1 ) | |
|         if( y1 < pic_height_in_luma_samples ) | |
|         coding_quadtree( x0, y1, cqtDepth + 1, cuWidth>>1, cuHeight>>1 ) | |
|         if( x1 < pic_width_in_luma_samples && y1 < pic_height_in_luma_samples ) | |
|         coding_quadtree( x1, y1, cqtDepth + 1 , cuWidth>>1, cuHeight>>1 ) | |
|     } else if ( ( ( cuHeight > cuMinBTSize \|\| cuWidth > cu MinBTSize ) && cuWidth <= cuMaxBTSize && cuHeight <= cuMAXBTSize && cuBTDepth < cuMaxBTDepth ) ) \|\| ( ( bBBoundary \|\| bRBoundary )? cqtDepth > FQT_LV-1 : false ) ){ | |
|       if( ! ( bBBoundary \|\| bRBoundary ) ) | |
|         bt_split_cu_flag[x0][y0] | ae( v ) |
|       if( bt_split_cu_flag[ x0 ][ y0 ] == 1 ){ | |
|         y1 = y0 + cuHeight >> 1 | |
|         coding_quadtree( x0, y0, cqtDepth, cuWidth, cuHeight >>1 ) | |
|         if( y1 < pic_height_in_luma_samples ) | |
|           coding_quadtree( x0, y1, cqtDepth, cuWidth, cuHeight >>1 ) | |
|     } else if ( bt_split_cu_flag[ x0 ][ y0 ] ==2 ) { | |
|       x1 = x0 + cuWidth >> 1 | |
|       coding_quadtree( x0, y0, cqtDepth, cuWidth >>1, cuHeight ) | |
|       if( x1 < pic_width_in_luma_samples ) | |
|         coding quadtree( x1, y0, cqtDepth, cuWidth>>1, cuHeight ) | |
|     } | |
|     } else | |
|         coding_unit( x0, y0, log2CbSize ) | |
| } | |

As can be seen, bt_split_cu_flag may be signaled. This flag is signaled when BT splitting of a CTU is configured for a CTU/CU not on a boundary (cf. condition if (!(bBBoundary||bRBoundary))). In case of a boundary, the forced splitting does not require additional flags because the value of the flag is derived. In particular, when bt_split_cu_flag[x0][y0] is not present (boundary case), the following applies:

If bBBoundary (meaning that the current CU/CTU is on the bottom boundary) is true and at the same time cuWidth is greater than MinBTSize or cuHeight is greater than MinBTSize (the current CU/CTU does not have the minimum size and can thus be in principle further split), the value of bt_split_cu_flag[x0][y0] is inferred to be equal to 1 (meaning that further binary splitting is performed, namely binary tree splitting which result in longer side of the split CU being parallel/concurring with the bottom, i.e. horizontal boundary).

bRBoundary (meaning that the current CU/CTU is on the right boundary) is true in the meantime cuWidth is greater than MinBTSize or cuHeight is greater than MinBTSize, the value of bt_split_cu_flag[x0][y0] is inferred to be equal to 2 (meaning that further binary splitting is performed, namely binary tree splitting which result in longer side of the split CU being parallel/concurring with the right, i.e. vertical boundary).

Otherwise, the value of bt_split_cu_flag[x0][y0] is inferred to be equal to 0, meaning that no further binary splitting is performed.

Being on boundary, means that there is no CU in the current partitioning hierarchy level or lower between the current CU and the boundary, in other words, the current CU belongs to the boundary portion in the current hierarchy level (corresponding to bBBoundary being true or bRBoundary being true). The BT splitting is used in case the QT is not forced (cqtDepth>FQT_LV−1) and the BT flag is included in the bitstream if the current CU is not a boundary CU.

Exemplary values for JEM implementation are cuMinBTSize for inter frame having value 4, cuMAXBTSize for inter frame being 128, and cuMAXBTDepth being 3. However, the present disclosure is not limited to these sizes and is applicable to any values selected.

It is noted that the above syntax is only exemplary and that it assumes knowledge of the variable FQT_LV which indicates the number of forced QT splitting levels. If the value of FQT_LV is zero, then there are no forced QT levels and the entire forced boundary splitting is performed by binary tree splitting. The syntax and semantics may be implemented differently without departing from the present disclosure.

Another solution based on JEM software (JEM 5 and 6) could be to specify the following semantic. When qt_split_cu_flag[x0][y0] is not present (boundary case), the value of qt_split_cu_flag[x0][y0] is inferred to be equal to 1, meaning further QT splitting in case of a corner CU or the forced QT (if cqtDepth<=FQT_LV−1).

When bt_split_cu_flag[x0][y0] is not present (boundary case), the following applies:
if bBBoundary is true, the value of bt_split_cu_flag[x0][y0] is inferred to be equal to 1, meaning that bottom boundary CU is split by binary splitting in vertical direction, i.e. to form two horizontal CUs (i.e. CUs longer in horizontal direction than in vertical direction).
if bRBoundary is true, the value of bt_split_cu_flag[x0][y0] is inferred to be equal to 2, meaning that right boundary CU is split by binary splitting in horizontal direction, i.e. to form two vertical CUs (i.e. CUs longer in vertical direction than in horizontal direction).

The above example shows a forced splitting with a parameter defining the number of forced QT levels before the BT splitting is applied. Semantic rules define the splitting to be adopted in case the splitting flag is not present, i.e. at the boundary. However, the present disclosure is not limited to such approach.

Alternatively, the boundary (incomplete) CTUs can be first partitioned by RD-optimization, and the remaining block located on the frame boundary can then use the forced BT partitioning or a combination of forced QT and forced BT partitioning. The partitioning by RD-optimization implies that the splitting flags are signaled in the bitstream for the corresponding CUs. The partitioning by RD may be specified (i.e. in standard or by signaling common for the sequence of pictures or picture) to be QT or specified to be BT so that a choice between the BT and QT does not have to be signaled for each CU. On the other hand, the splitting flag may be extended to not only indicate whether or not the given CU is split but also whether it is split by QT or BT.

At the decoder side, forced partitioning will be operated on the boundary CTUs/CUs. For the forced BT partitioning, forced horizontal BT (splitting in vertical direction to form horizontal partitions) will be used on the CTUs/CUs located on the bottom boundary until the right bottom samples of the leaf nodes are inside the slice/picture bottom boundary. Forced vertical BT will be used on the CTUs/CUs located on the right boundary until the right bottom samples of the leaf nodes are inside the slice/picture right boundary. The right bottom corner CTUs/CUs will be partitioned using forced QT until the right bottom samples of the leaf node are inside of the slice/picture boundary or the leaf nodes become right/bottom boundary case. Further partitions are operated based on the decoded splitting flag which may be QT or BT splitting flag depending on whether there is a number of forced QT partitioning levels defined, as already described above with reference to the syntax. The syntax elements are generated by the encoder and handled by the decoder as explained above.

For the combination of forced QT and forced BT, the number of forced QT levels for boundary CTU (corresponding to the parameter FQT_LV) may be adaptively selected based on temporal id/slice type, or decoded from the bitstream. The decoded force QT level could be extracted from the slice header, SPS or PPS. The boundary CTU/CU is forced BT partitioned only after the forced QT partition. When the right bottom samples of leaf nodes are within the boundary, the forced splitting will be terminated. Further partition is done based on the decoded splitting flag.

In other words, according to a first implementation, at the decoder, if a CTU is located on slice/picture boundary, binary tree partitioning is performed without indicator of binary tree partition (flag) and/or indicator of the binary tree partition type (indication of whether BT or QT is to be performed). The binary partitioning is terminated when the right bottom sample of the leaf node is located within the slice/picture boundary (i.e. not crossing the picture boundary).

Thus, instead of a forced QT boundary partitioning, forced BT for boundary CTUs is introduced. Forced horizontal BT for bottom boundary and forced vertical BT for right boundary are implemented. For the right bottom corner boundary, forced QT will be used until the current CU does not need to be forced partitioned any longer (since the minimum size is reached) or the current CU is on the bottom or the right boundary.

In another implementation of the present disclosure, a combination of forced QT and forced BT partitioning is also possible. Accordingly, forced BT partitioning is only done after a certain number of forced QT levels. For the combination of forced QT and forced BT partitioning, the levels of forced QT can be adaptive selected by the temporal id or slice type. Alternatively, the levels of forced QT can be adjusted by costs and included into the bitstream to indicate how many levels of forced QT are used for the decoder.

Even more flexibility is achieved when the boundary CTUs are at first partitioned by RD-optimization, and only the remaining blocks located on the frame boundary (i.e. incomplete CUs which are located partially within the picture and partially outside the picture) can use the proposed forced BT partition or a combination of forced QT and forced BT partition as described above.

The partitioning as described so far can be employed in still image or video coding. In particular, the partitioning can be employed in the encoder and in the decoder which are shown in FIGS. 1 and 2, in the splitting unit 110 and the splitting unit 250, respectively.

Accordingly, the present disclosure also provides an apparatus for encoding an image of a video sequence comprising: the apparatus (splitting unit) 110 for splitting an image portion into coding units according to any of examples described above, an image coding unit 120-145, 160-195 configured to encode the coding units, and a bitstream forming unit 150 configured to generate a bitstream including the coded coding units and a partitioning information indicating how the coding tree units are partitioned.

The encoder may further comprise a rate-distortion optimization unit (not shown in FIG. 1) configured to determine hierarchical partitioning the boundary portion according to rate-distortion optimization for any of partitioning levels apart from the deepest level. The RD-optimization unit may perform encoding using different encoder settings with respect to partitioning and select the setting resulting in minimum cost function. The cost function may be minimum rate for the given distortion level or similarity between the prediction and the original block to be coded or the like.

Moreover, an apparatus for decoding an image of a video sequence is provided comprising: the apparatus 250 for determining splitting of an image portion to be decoded into coding units as described above, a bitstream parser 250 for parsing a bitstream including the coded coding units and a partitioning information indicating how the coding tree units are partitioned and based on the determined splitting of the image portion, and an image decoding unit 225-240, 260-295 for decoding the coded coding units.

It is noted that the splitting and the parsing are performed recursively together: the parsing includes separating from the bitstream for the current CU the control information necessary and splitting uses the parsed information and/or semantic knowledge to derive the CU locations, sizes and data. In particular, the parser may deliver the splitting flag and based thereon the splitter either further splits the current CU or maintains its size. Depending on the splitting flag also the parser either further parses the splitting information for the CUs of a further depth or parses splitting information for other CUs of the same depth, or parses data to be decoded for the CUs. Moreover, the splitter is configured to partition the boundary portion as described above even without further bitstream signaling according to forced partitioning rules.

In other words the encoder and/or the decoder may both employ splitting of the boundary portion into coding units as a predefined splitting. Then, the partitioning information in the bitstream does not relate to the splitting of the boundary portion at all. This is the case when the boundary is split in a predefined manner which may still include deriving the splitting on the basis of other encoder settings such as picture type/temporal ID/slice type.

Alternatively, the encoder and/or the decoder can be further configured to partition boundary portion by quad-tree splitting in N shallowest levels, N being an integer larger than or equal to zero and smaller than the number of partitioning hierarchy levels; and partition boundary portion by binary tree splitting in the remaining partitioning hierarchy levels, and the partitioning information includes indication of N. The partitioning information may further include splitting flag for indicating whether or not boundary portion CTUs/CUs are to be split and/or in which kind of splitting (may include binary-tree or quad-tree and/or other options). The splitting flag may be signaled for all partitions (CUs) or only for those which are not located on the boundary in their hierarchy level.

The encoder and/or decoder may be implemented (embedded) on a chip or by means of software. However, the encoder and/or decoder may be also implemented on a plurality of hardware and software components.

Above, two kinds of splitting were mostly discussed, the quad-tree splitting and the binary-tree splitting. However, the cost-based or predefined boundary forced partitioning approached provided by the present disclosure are also suitable for other forced partition structure, not only forced QT or forced BT.

Above, mostly the case has been described, in which a deepest CU in the forced splitting of the boundary portion is a rectangular but not square CU, i.e. a CU with one side longer than the other side.

However, in general, the boundary portion may be partitioned by binary tree splitting at least in one of the partitioning levels in which a boundary coding unit remains not entirely within the boundary portion. In other words, according to the present disclosure, the apparatus for splitting an image portion into coding units may include a processing circuitry which, in operation subdivides the image portion into an integer number of coding tree units with a predetermined size and a boundary portion with a size smaller than the predetermined size in at least a first direction which is either horizontal or vertical direction, and partitions the boundary portion hierarchically into coding units including a coding unit with different sizes in respective horizontal and vertical directions, the coding unit being partly located in the boundary portion and partly out of the image portion. In particular, the binary tree splitting may be used for any boundary CUs.

It is noted that the boundary portion shown in FIG. 7 includes several CTUs. The above exemplary embodiments and implementations were described for partitioning of one CTU. This is because even if only one of the (incomplete) CTUs in the boundary portion is partitioned as described above it may be advantageous and lead to better results in terms of coding efficiency and/or complexity. However, more than one CTUs of the boundary portion may be partitioned as described above. The partitioning may be performed sequentially CTU by CTU. In some implementations, it may be beneficial to perform partitioning for different CTUs in parallel. Parallel processing may reduce the coding/decoding delay if employed by the encoder/decoder respectively.

In other words, it may be advantageous to apply the above described partitioning to all CTUs of the boundary portion. On the other hand, the present disclosure is not limited thereto and the partitioning may be applied to one or more boundary CTUs. The remaining CTUs may be split by any other partitioning, for instance QT only or the like.

A corresponding method for partitioning is also provided. The corresponding encoding and decoding apparatuses and methods which employ such partitioning are further provided.

The present disclosure may be implemented in an apparatus. Such apparatus may be a combination of a software and hardware. For example, the intra-prediction and deblocking filtering may be performed by a chip such as a general purpose processor, or a digital signal processor (DSP), or a field programmable gate array (FPGA), or the like. However, the present invention is not limited to implementation on a programmable hardware. It may be implemented on an application-specific integrated circuit (ASIC) or by a combination of the above mentioned hardware components.

The intra-prediction and deblocking filtering determination may also be implemented by program instructions stored on a computer readable medium which when executed by a computed perform the steps of a method as described above. The computer readable medium can be any medium on which the program is stored such as a DVD, CD, USB (flash) drive, hard disc, server storage available via a network, etc.

The encoder and/or decoder may be implemented in various devices including a TV set, set top box, PC, tablet, smartphone, or the like. It may be a software, app implementing the method steps.

Summarizing, the present disclosure relates to partitioning of an image or an image slice. In particular, the image or image slice is split into an integer number of coding tree units in both vertical and horizontal directions. The remaining boundary portion is then at least partly forced-split so that the deepest partitioning level is a result of binary partitioning, i.e. includes a coding unit which is longer on one side than on the other side. The longer side is parallel or concurrent to the image or image slice boundary.

What is claimed is:

1. An apparatus for splitting a portion of a picture into coding units, the apparatus including a processing circuitry configured to:
   subdivide the portion of the picture into an integer number of coding tree units with a predetermined size and a boundary coding tree unit located on a picture boundary, wherein the boundary coding tree unit comprises a first portion located inside the picture with a size smaller than the predetermined size in at least a first direction, which is either a horizontal or a vertical direction, and a second portion located outside the picture; and
   partition the boundary coding tree unit by quad-tree partitioning in N shallowest levels, N being an integer larger than zero and smaller than a number of partitioning hierarchy levels of the boundary coding tree unit, and partition at least one coding unit resulting from the quad-tree partitioning into a number of coding units with different sizes in the horizontal direction and the vertical direction according to a binary-tree partitioning,
   wherein, responsive to determining that a current coding unit of the number of coding units is located on the picture boundary with a first portion of the current coding unit located inside the picture and a second portion of the current coding unit located outside the picture, the processing circuitry is configured to recursively partition the current coding unit according to the binary-tree partitioning until each coding unit resulting from the recursive partitioning is located inside the picture.

2. The apparatus according to claim 1, wherein the current coding unit is partitioned using a horizontal binary-tree partitioning responsive to determining that the current coding unit is located on a bottom boundary of the picture and no sample of the current coding unit is located beyond a right boundary of the picture, or wherein the current coding unit is partitioned using a vertical binary-tree partitioning responsive to determining that the current coding unit is located on a right boundary of the picture and no sample of the current coding unit is located beyond a bottom boundary of the picture.

3. The apparatus according to claim 1, wherein the apparatus comprises an encoder, the encoder is further configured to generate a bitstream to encode the portion of the picture, and a partition flag for the current coding unit is not included in the bitstream.

4. The apparatus according to claim 1, wherein the apparatus comprises a decoder, the decoder is further configured to receive a bitstream that encodes the portion of the picture, and the bitstream does not include a partition flag for the current coding unit.

5. The apparatus according to claim 1, wherein the processing circuitry is further configured to:
   recursively partition a corner boundary coding tree unit according to a quad-tree partitioning until a right bottom sample of each coding unit resulting from the partitioning is located inside the picture.

6. The apparatus according to claim 1, wherein the processing circuitry is further configured to partition a particular coding unit partitioned from the current coding unit and having a bottom right sample located inside the picture based on rate-distortion optimization.

7. An apparatus for encoding an image of a video sequence, the apparatus comprising:
   the apparatus for splitting a portion of the image into coding units according to claim 1;
   an image coding unit configured to encode the coding units; and
   a bitstream forming unit configured to generate a bitstream including the encoded coding units, wherein a partition flag indicating the partitioning of the at least one coding unit resulting from the partitioning of the boundary coding tree unit is not included in the bitstream.

8. An apparatus for decoding an image of a video sequence comprising:
   the apparatus for splitting a portion of the image into coding units according to claim 1;
   a bitstream parser for parsing a bitstream including encoded coding units, wherein the bitstream does not include a partition flag for the at least one coding unit resulting from the partitioning of the boundary coding tree unit; and
   an image decoding unit for decoding the encoded coding units.

9. A method for splitting a portion of an image into coding units, the method comprising:
   subdividing the portion of the image into an integer number of coding tree units with a predetermined size and a boundary coding tree unit located on a picture boundary, wherein the boundary coding tree unit comprises a first portion located inside the picture with a size smaller than the predetermined size in at least a first direction, which is either a horizontal or a vertical direction, and a second portion located outside the picture; and partitioning the boundary coding tree unit by quad-tree partitioning in N shallowest levels, N being an integer larger than zero and smaller than a number of partitioning hierarchy levels of the boundary coding tree unit, and partitioning at least one coding unit resulting from the quad-tree partitioning into a number of coding units with different sizes in the horizontal direction and the vertical direction according to a binary-tree partitioning, wherein, responsive to determining that a current coding unit of the number of coding units is located on the picture boundary with a first portion of the current coding unit located inside the picture and a second portion of the current coding unit located outside the picture, the processor is configured to recursively partition the current coding unit according to the binary-tree partitioning until each coding unit resulting from the recursive partitioning is located inside the picture.

10. A non-transitory computer readable medium storing instructions that, when executed by a processor, cause the processor to split a portion of an image into coding units by:

subdividing the portion of the image into an integer number of coding tree units with a predetermined size and a boundary coding tree unit located on a picture boundary, wherein the boundary coding tree unit comprises a first portion located inside the picture with a size smaller than the predetermined size in at least a first direction, which is either a horizontal or a vertical direction, and a second portion located outside the picture; and partitioning the boundary coding tree unit by quad-tree partitioning in N shallowest levels, N being an integer larger than zero and smaller than a number of partitioning hierarchy levels of the boundary coding tree unit, and partitioning at least one coding unit resulting from the quad-tree partitioning into a number of coding units with different sizes in the horizontal direction and the vertical direction according to a binary-tree partitioning, wherein, responsive to determining that a current coding unit of the number of coding units is located on the picture boundary with a first portion of the current coding unit located inside the picture and a second portion of the current coding unit located outside the picture, the processor is configured to recursively partition the current coding unit according to the binary-tree partitioning until each coding unit resulting from the recursive partitioning is located inside the picture.

* * * * *